United States Patent
Yoshida et al.

(10) Patent No.: US 11,098,190 B2
(45) Date of Patent: Aug. 24, 2021

(54) POLYBUTYLENE TEREPHTHALATE RESIN COMPOSITION AND MOLDED ARTICLE

(71) Applicant: Mitsubishi Engineering-Plastics Corporation, Minato-ku (JP)

(72) Inventors: Souki Yoshida, Hiratsuka (JP); Yasushi Yamanaka, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 127 days.

(21) Appl. No.: 16/097,426

(22) PCT Filed: May 17, 2017

(86) PCT No.: PCT/JP2017/018469
§ 371 (c)(1),
(2) Date: Oct. 29, 2018

(87) PCT Pub. No.: WO2017/199989
PCT Pub. Date: Nov. 23, 2017

(65) Prior Publication Data
US 2019/0185659 A1     Jun. 20, 2019

(30) Foreign Application Priority Data

May 19, 2016  (JP) .............................. JP2016-100664
May 16, 2017  (JP) .............................. JP2017-097381
May 16, 2017  (JP) .............................. JP2017-097382

(51) Int. Cl.
*C08L 67/02*     (2006.01)
*C08J 5/00*      (2006.01)
(Continued)

(52) U.S. Cl.
CPC ................. *C08L 67/02* (2013.01); *C08J 5/00* (2013.01); *C08L 23/08* (2013.01); *C08L 63/00* (2013.01);
(Continued)

(58) Field of Classification Search
CPC ...................................................... C08L 67/02
See application file for complete search history.

(56) References Cited

U.S. PATENT DOCUMENTS 5,162,424 A * 11/1992 de Boer ................. C08L 67/02
                                                          524/505
5,837,770 A    11/1998 Yamaguchi et al.
(Continued)

FOREIGN PATENT DOCUMENTS

EP     1 614 716 A1    1/2006
JP     5-171011 A      7/1993
(Continued)

OTHER PUBLICATIONS

Office Action dated Jan. 15, 2019 in Japanese Patent Application No. 2018-011112, 7 pages (with unedited computer generated English translation).
International Search Report dated Jul. 4, 2017 in PCT/JP2017/018469 filed May 17, 2017.

*Primary Examiner* — Michael F Pepitone
(74) *Attorney, Agent, or Firm* — Oblon, McClelland, Maier & Neustadt, L.L.P.

(57) ABSTRACT

Provided is a polybutylene terephthalate resin composition containing, with respect to 100 parts by mass of (A) a polybutylene terephthalate resin, (B) a total of 30 to 60 parts by mass of at least two different brominated flame retardants selected from the group consisting of a brominated epoxy compound, a brominated polycarbonate compound and a brominated polystyrene compound, (C) 5 to 15 parts by mass of an antimony compound, (D) 5 to 30 parts by mass of an elastomer, and (E) 0.5 to 3 parts by mass of a mold-release agent.

13 Claims, 4 Drawing Sheets

(51) Int. Cl.
  *C08L 23/08* (2006.01)
  *C08L 63/00* (2006.01)
  *H01R 13/533* (2006.01)
  *H01B 3/40* (2006.01)
(52) U.S. Cl.
  CPC ........ *H01R 13/533* (2013.01); *C08L 2201/02* (2013.01); *C08L 2203/20* (2013.01); *C08L 2205/025* (2013.01); *C08L 2205/035* (2013.01); *C08L 2205/06* (2013.01); *H01B 3/40* (2013.01); *H01R 2201/26* (2013.01)

(56) References Cited

U.S. PATENT DOCUMENTS

| | | | |
|---|---|---|---|
| 8,754,171 | B2 | 6/2014 | Kurouchi et al. |
| 9,957,388 | B2 * | 5/2018 | Yamanaka ............. C08K 5/523 |
| 2004/0176511 | A1 | 9/2004 | Osamu et al. |
| 2009/0264611 | A1 * | 10/2009 | Hamano ................ C08G 63/85 528/9 |

FOREIGN PATENT DOCUMENTS

| | | | |
|---|---|---|---|
| JP | 8-231833 | A | 9/1996 |
| JP | 9-194698 | A | 7/1997 |
| JP | 11-162330 | A | 6/1999 |
| JP | 2003-26904 | A | 1/2003 |
| JP | 2004-263174 | A | 9/2004 |
| JP | 2006-45544 | A | 2/2006 |
| JP | 2006-56997 | A | 3/2006 |
| JP | 2006-104361 | A | 4/2006 |
| JP | 2007-138018 | A | 6/2007 |
| JP | 2010-6937 | A | 1/2010 |
| JP | 2012-107126 | A | 6/2012 |
| JP | 2013-234326 | A | 11/2013 |
| JP | 5616532 | B2 | 10/2014 |
| JP | 2016-28120 | A | 2/2016 |
| JP | 2016-117194 | A | 6/2016 |
| JP | 2017-11152 | A | 1/2017 |
| WO | WO-2014109352 | A1 * | 7/2014 ............... C08K 3/22 |

* cited by examiner

[Fig. 1]
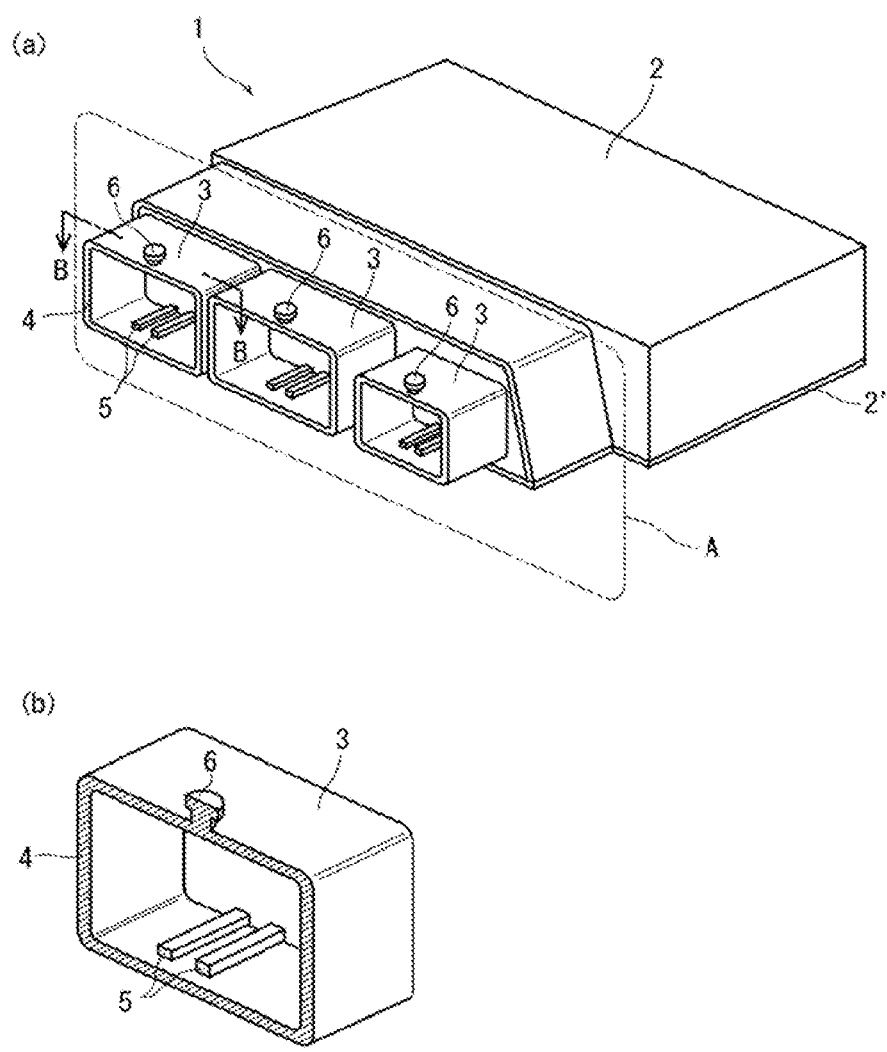

[Fig. 2]
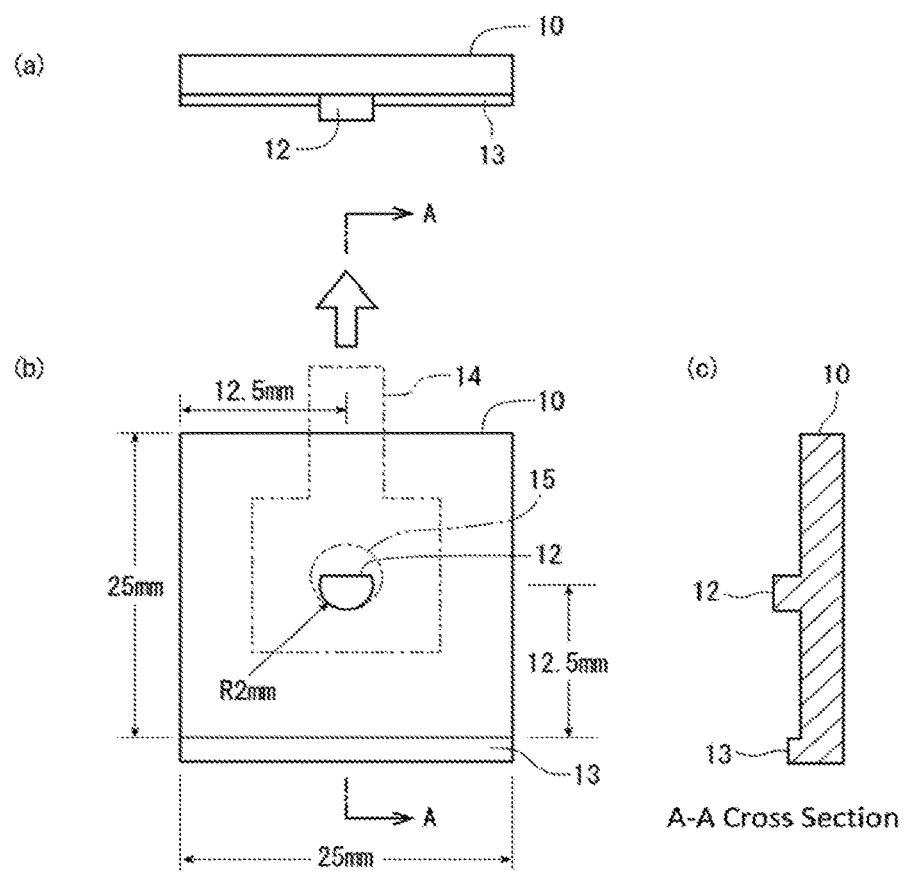
[Fig. 3]
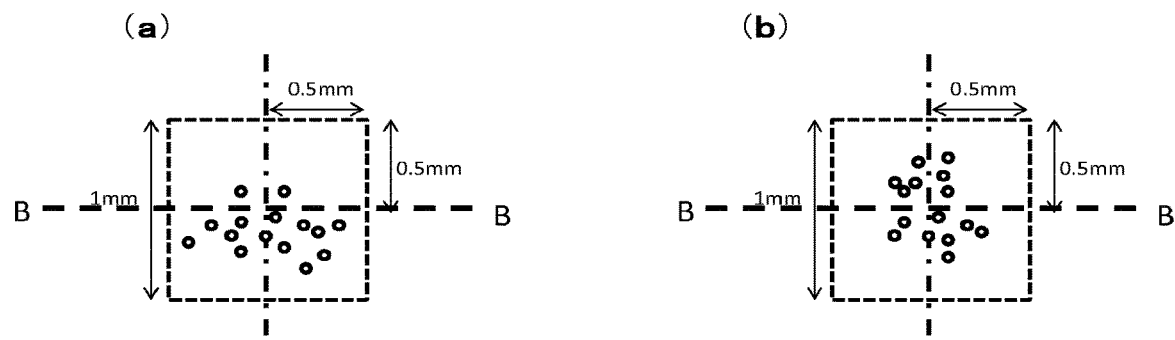

[Fig. 4]
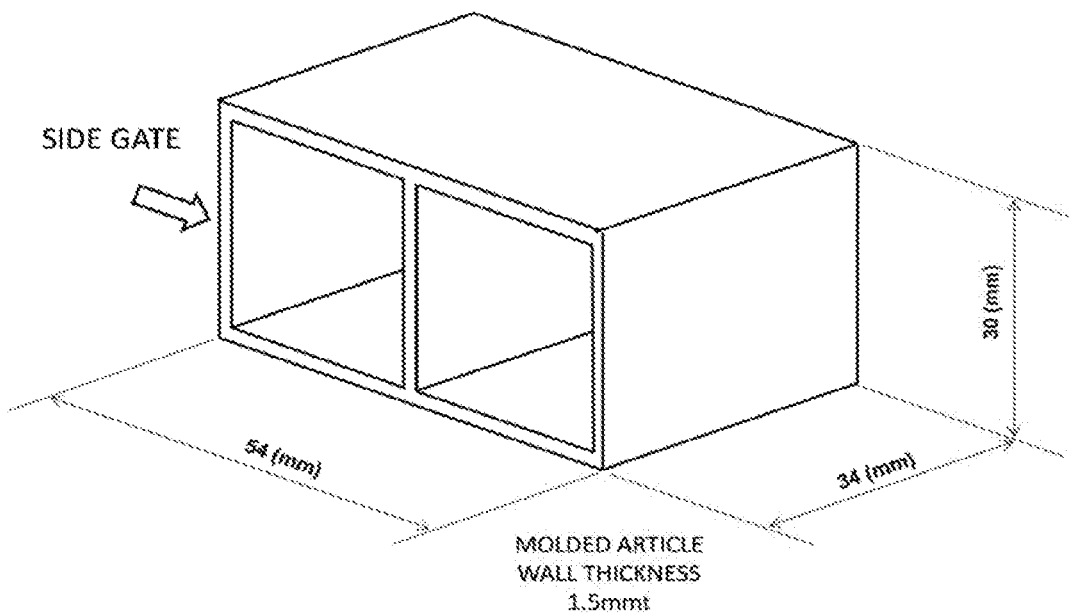
[Fig. 5]
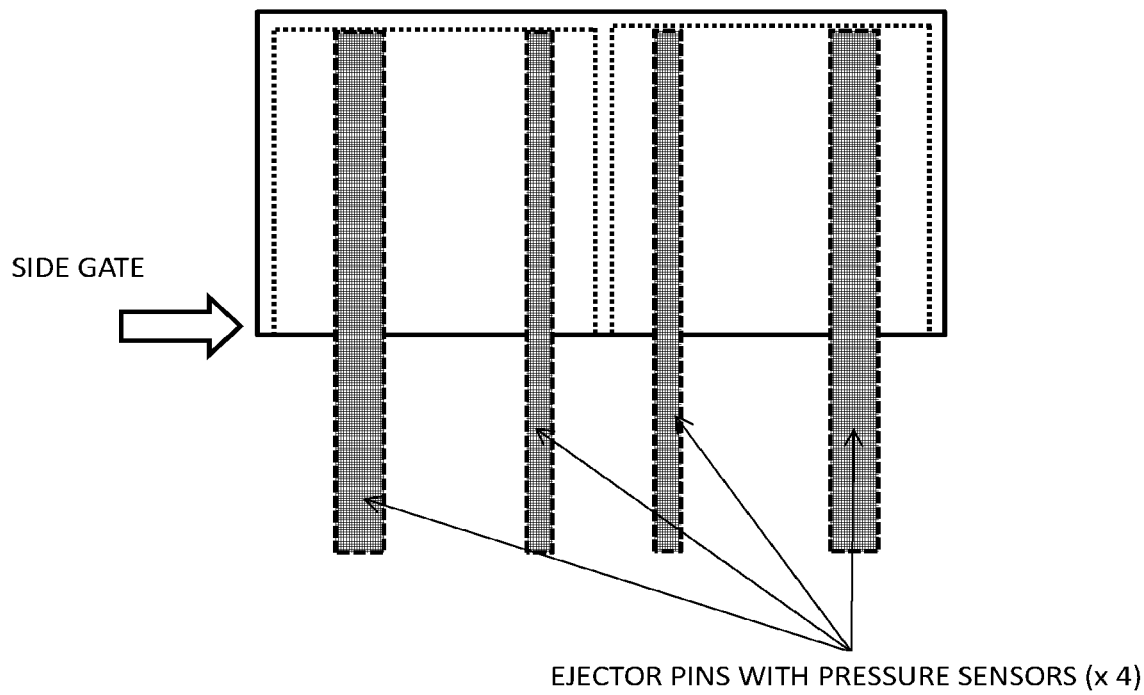

[Fig. 6]
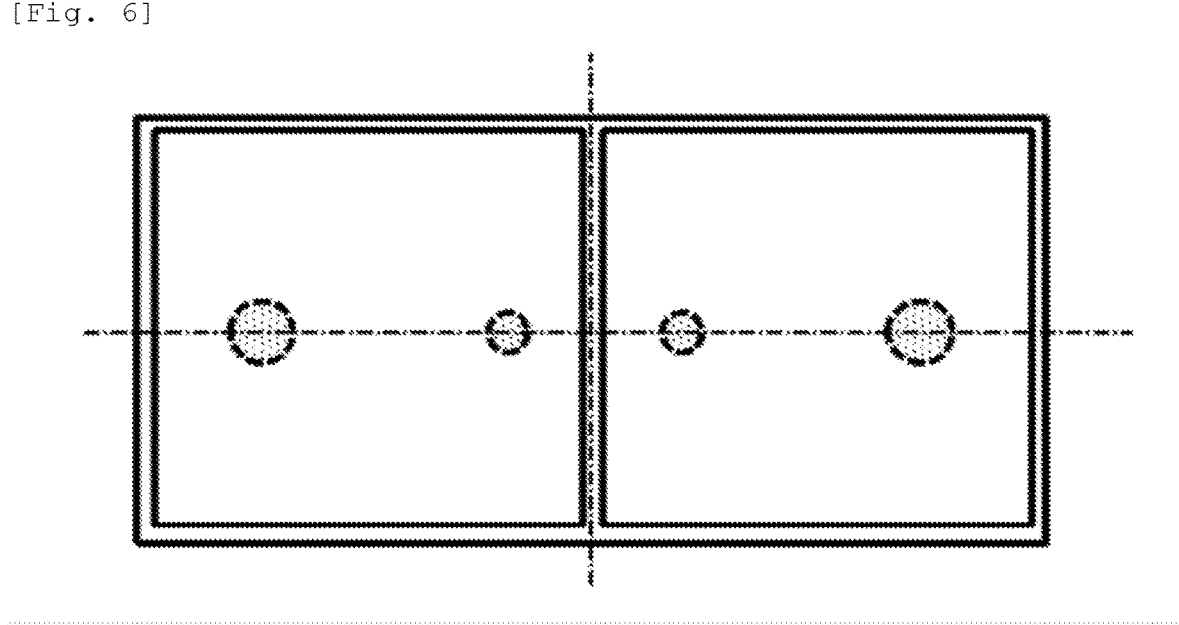

POLYBUTYLENE TEREPHTHALATE RESIN COMPOSITION AND MOLDED ARTICLE

CROSS REFERENCE TO RELATED APPLICATIONS

This application is a National Stage of International Application No. PCT/JP2017/018469, filed May 17, 2017, and claims priority to Japanese Patent Application No. 2016-100664, filed May 19, 2016, Japanese Patent Application No. 2017-097381, filed May 16, 2017, and Japanese Patent Application No. 2017-097382, filed May 16, 2017, the disclosures of which are incorporated herein by reference in their entireties.

TECHNICAL FIELD

The present invention relates to a polybutylene terephthalate resin composition and a molded article, and more specifically relates to a polybutylene terephthalate resin composition which generates few internal voids in a protrusion (hereinafter referred to as a boss part) provided on a molded article, exhibits excellent strength of the boss part, and exhibits excellent flame retardancy, mold-release properties and hydrolysis resistance; a molded article therefrom; and a connector connection port for external connection of an electronic device.

BACKGROUND ART

Polybutylene terephthalate resins exhibit excellent mechanical strength, chemical resistance, electrical insulating properties, and the like, and also exhibit excellent heat resistance, moldability and recyclability, and are therefore widely used in components for electrical and electronic devices and motor vehicles, and also in electrical equipment components, mechanical components, and the like.

In the automotive field, for example, engine control units (ECU) which detect vehicle activity and carry out a variety of controls based on the detection results are fitted as electronic control devices, input/output circuits connected to microcomputers for carrying out calculations, external control devices such as electromagnetic valves and electric motors, sensors for detecting state quantities, and the like, and power supply circuits that supply electrical power to these microcomputers and input/output circuits are disposed on control boards, and such control boards are housed in resin housing cases. In addition, connector parts for external connections, which are used for input/output to/from power sources, external control devices, sensors, and the like, are also provided on control boards in housing cases.

In addition, ECU is often installed in engine bays of motor vehicles. When attaching ECU to vehicle bodies, methods involving fixing screws involve problems in terms of workability and reducing weight, and have the drawback that screws are readily corroded by snow melting agents such as calcium chloride. As a result, it has become common in recent years to provide boss parts on outer and inner peripheral walls of resin housing cases and fix the boss parts to attachment parts provided on the vehicle body side.

Consideration has been given to use of polybutylene terephthalate resin materials as such housing cases from the perspectives of mechanical strength, chemical resistance, electrical insulating properties, heat resistance, moldability and light weight, but high flame retardancy is required. Use of brominated flame retardants (for example, see PTL 1 to 3) and combinations of brominated flame retardants and antimony compounds as auxiliary flame retardants (for example, see PTL 4 to 6) have been used as methods for imparting polybutylene terephthalate resins with flame retardancy.

High flame retardancy can certainly be achieved by using a combination of a brominated flame retardant and an antimony compound. As a result of research by the inventors of the present invention, however, it is clear that simply by using such a combination, internal voids generated in the boss parts mentioned above tend to cause the strength of the boss parts (hereinafter referred to as "boss strength") to deteriorate and cause fixing of the housing case to the vehicle body to be insecure.

CITATION LIST

Patent Literature

[PTL 1] JP 2003-26904 A
[PTL 2] JP 2013-234326 A
[PTL 3] JP H11-162330 A
[PTL 4] JP 2004-263174 A
[PTL 5] JP 2006-45544 A
[PTL 6] JP 2006-56997 A

SUMMARY OF INVENTION

Technical Problem

In view of the circumstances described above, the purpose of (problem to be addressed by) the present invention is to provide a polybutylene terephthalate resin composition which generates few internal voids in a boss part provided on a molded article, exhibits excellent boss part strength, and exhibits excellent flame retardancy, mold-release properties and hydrolysis resistance; and a connector connection port for external connection of an electronic device.

Solution to Problem

As a result of diligent research into resin compositions obtained by incorporating brominated flame retardants and antimony compounds in polybutylene terephthalate resins, the inventors of the present invention found that the problems mentioned above could be solved by a polybutylene terephthalate resin composition that contains a combination of at least two different brominated flame retardants selected from the group consisting of a brominated epoxy compound, a brominated polycarbonate compound and a brominated polystyrene compound, an elastomer and a mold-release agent, and thereby completed the present invention.

The present invention relates to a polybutylene terephthalate resin composition and a molded article.

[1] A polybutylene terephthalate resin composition containing, with respect to 100 parts by mass of (A) a polybutylene terephthalate resin, (B) a total of 30 to 60 parts by mass of at least two different brominated flame retardants selected from the group consisting of a brominated epoxy compound, a brominated polycarbonate compound and a brominated polystyrene compound, (C) 5 to 15 parts by mass of an antimony compound, (D) 5 to 30 parts by mass of an elastomer, and (E) 0.5 to 3 parts by mass of a mold-release agent.

[2] The polybutylene terephthalate resin composition according to [1] above, wherein the brominated flame retardants (B) are a brominated flame retardant (B1), which is selected from among a brominated epoxy compound and a brominated polycarbonate compound and which has a weight average molecular weight of 1000 to 8000, and a brominated flame retardant (B2), which is selected from among a brominated epoxy compound and a brominated polystyrene compound and which has a weight average molecular weight of more than 8000 to 70000.

[3] The polybutylene terephthalate resin composition according to [1] or [2] above, which has a crystallization temperature of 193° C. or lower.

[4] The polybutylene terephthalate resin composition according to any one of [1] to [3] above, wherein the two or more brominated flame retardants (B) are all brominated epoxy compounds.

[5] The polybutylene terephthalate resin composition according to any one of [1] to [4] above, wherein the brominated epoxy compound is terminally capped by tribromophenol.

[6] The polybutylene terephthalate resin composition according to [2] above, wherein a mass ratio (B1)/(B2) of the flame retardant (B1) and the flame retardant (B2) is 90/10 to 30/70.

[7] The polybutylene terephthalate resin composition according to any one of [1] to [6] above, wherein the elastomer (D) is an ethylenic elastomer.

[8] The polybutylene terephthalate resin composition according to [7] above, wherein the ethylenic elastomer is an ethylene-alkyl acrylate ester-glycidyl methacrylate copolymer.

[9] The polybutylene terephthalate resin composition according to any one of [1] to [8] above, wherein the mold-release agent (E) is a montanic acid ester mold-release agent.

[10] The polybutylene terephthalate resin composition according to any one of [1] to [9] above, wherein a moisture content in the resin composition is 500 ppm or less.

[11] A molded article of the polybutylene terephthalate-based resin composition according to any one of [1] to [10] above.

[12] The molded article according to [11] above, which is a part for a vehicular electrical component.

In addition, the present invention relates to the following connector connection port for external connection of an electronic device.

[13] A connector connection port for external connection of an electronic device, which is used for inserting and connecting an external connector in the electronic device, wherein the connector connection port is formed of a molded body obtained by injection molding of a polybutylene terephthalate resin material, and a boss part is provided in a protruding form on an outer peripheral surface or inner peripheral surface of the connector connection port, voids are present in the polybutylene terephthalate resin material in the boss part and a lower part of the outer peripheral surface or inner peripheral surface on which the boss part is provided in a protruding form, and when a sum total of cross-sectional areas of voids which are present in a region lying at a height of 0 to 0.5 mm from the outer peripheral surface or inner peripheral surface in the boss part is denoted by S1, a sum total of cross-sectional areas of voids which are present in a region lying at a depth of 0 to 0.5 mm from the outer peripheral surface or inner peripheral surface on which the boss part is provided in a protruding form is denoted by S2, and a total area of S1 and S2 is taken to be 100%, an areal ratio of S1 is 5% to 45% and an areal ratio of S2 is 55% to 95%.

[14] The connector connection port for external connection according to [13] above, wherein the polybutylene terephthalate resin material is a polybutylene terephthalate resin composition that contains at least one selected from the group consisting of an epoxy compound, a brominated epoxy compound and an epoxy group-containing elastomer.

[15] The connector connection port for external connection according to [13] or [14] above, wherein the polybutylene terephthalate resin material is a polybutylene terephthalate resin composition that contains at least two different brominated flame retardants selected from the group consisting of a brominated epoxy compound, a brominated polycarbonate compound and a brominated polystyrene compound.

[16] The connector connection port for external connection according to any one of [13] to [15] above, wherein the connector connection port is a connector connection port for external connection which is provided on a side surface of a housing of the electronic device that houses the electronic device and a connector for external connection and which is used for insertion and connection of the external connector.

[17] The connector connection port for external connection according to [16] above, wherein the electronic device is a vehicular electronic device.

[18] The connector connection port for external connection according to [17] above, wherein the vehicular electronic device is an engine control unit.

Advantageous Effects of Invention

The polybutylene terephthalate resin composition of the present invention generates few internal voids when molded into a molded article, and therefore exhibits excellent strength and, even in cases where a flame retardant is introduced, achieves a balance between strength and flame retardancy and exhibits excellent mold-release properties and hydrolysis resistance.

By using a combination of at least two different flame retardants or flame retardants having different molecular weights, which are selected from a brominated epoxy compound, a brominated polycarbonate compound and a brominated polystyrene compound, it is thought that it is possible to lower the crystallization temperature of the resin composition, thereby lengthening the time until crystallization of a charged molten resin occurs during molding, improving filling of the molten resin into a boss part or the vicinity thereof, and achieving excellent boss part strength. If the crystallization temperature is high, solidification occurs rapidly, filling of the molten resin into a boss part or the vicinity thereof becomes difficult, voids are readily formed upon solidification, and boss part strength deteriorates.

In addition, in the connector connection port for external connection of the present invention, by setting the distribution of voids present in the polybutylene terephthalate resin material in a boss part and voids present below the boss part to be the proportions mentioned above, excellent boss strength is achieved.

BRIEF DESCRIPTION OF DRAWINGS

FIG. 1 is a perspective view that shows one example of an engine control unit.

FIG. 2 is a diagram that shows a test piece with boss part, which is used in the examples.

FIG. 3 is a schematic diagram that shows the distribution of voids in a cross section of a boss part and a portion below the boss part in a test piece with boss part, which is used in the examples.

FIG. 4 is a perspective view that shows the shape of a box-shaped molded article that is used to evaluate mold-release properties in the examples and comparative examples of the present invention.

FIG. 5 is a top view that shows the box-shaped molded article shown in FIG. 4 and ejector pins.

FIG. 6 is an explanatory view that shows the positions of ejector pins at the bottom of a box-shaped molded article.

DESCRIPTION OF EMBODIMENTS

The contents of the present invention will now be explained in detail.

Explanations of the constituent features described below are based on representative embodiments and specific examples of the present invention, but it should be understood that the present invention is not limited to such embodiments or specific examples. Moreover, use of "to" in the present specification means that numerical values mentioned before and after the "to" include the lower limit and upper limit thereof.

[(A) Polybutylene terephthalate resin]

The polybutylene terephthalate resin (A) used in the present invention is a polyester resin having a structure in which terephthalic acid units and 1,4-butane diol units are bonded by ester bonds, and includes, in addition to polybutylene terephthalate resins (homopolymers), polybutylene terephthalate copolymers that contain other copolymer components in addition to terephthalic acid units and 1,4-butane diol units, and mixtures of homopolymers and such copolymers.

In cases where the polybutylene terephthalate resin (A) contains dicarboxylic acid units other than terephthalic acid, specific examples of the other dicarboxylic acids include aromatic dicarboxylic acids such as isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl)methane, anthracenedicarboxylic acid and 4,4'-diphenyl ether dicarboxylic acid; alicyclic dicarboxylic acids such as 1,4-cyclohexanedicarboxylic acid and 4,4'-dicyclohexyldicarboxylic acid; and aliphatic dicarboxylic acids such as adipic acid, sebacic acid, azelaic acid and dimer acids.

Moreover, in cases where these dicarboxylic acids other than terephthalic acid are contained, it is preferable for the copolymer to contain not less than 1 mol % and less than 50 mol % of the other dicarboxylic acids relative to all the segments of the polybutylene terephthalate resin. Within this range, the copolymer preferably contains not less than 2 mol % and less than 50 mol %, more preferably 3 to 40 mol %, and particularly preferably 5 to 20 mol %, of the other dicarboxylic acids.

In cases where the polybutylene terephthalate resin (A) contains diol units other than 1,4-butane diol, specific examples of these other diol units include aliphatic and alicyclic diols having 2 to 20 carbon atoms and bisphenol derivatives. Specific examples thereof include ethylene glycol, propylene glycol, 1,5-pentane diol, 1,6-hexane diol, neopentyl glycol, decamethylene glycol, cyclohexane dimethanol, 4,4'-dicyclohexylhydroxymethane, 4,4'-dicyclohexylhydroxypropane and ethylene oxide-added diols of bisphenol A. Moreover, it is possible to copolymerize a small quantity of one or more long chain diols having molecular weights of 400 to 6000, such as polyethylene glycol, poly-1,3-propylene glycol or polytetramethylene glycol.

In addition to difunctional monomers such as those mentioned above, it is possible to additionally use a small quantity of a trifunctional monomer, such as trimellitic acid, trimesic acid, pyromellitic acid, pentaerythritol or trimethylolpropane in order to introduce a branched structure, or a monofunctional compound such as a fatty acid in order to adjust molecular weight.

Moreover, in cases where these diols other than 1,4-butane diol are contained, it is preferable for the copolymer to contain not less than 1 mol % and less than 50 mol % of the other diols relative to all the segments of the polybutylene terephthalate resin. Within this range, the copolymer preferably contains not less than 2 mol % and less than 50 mol %, more preferably 3 to 40 mol %, and particularly preferably 5 to 20 mol %, of the other diols.

It is preferable for the polybutylene terephthalate resin (A) to be a polybutylene terephthalate homopolymer obtained by polycondensing terephthalic acid and 1,4-butane diol, but the polybutylene terephthalate resin may also be a polybutylene terephthalate copolymer that contains one or more dicarboxylic acids other than terephthalic acid as carboxylic acid units and/or one or more diols other than 1,4-butane diol as diol units. From the perspectives of mechanical properties and heat resistance, the proportion of terephthalic acid in the dicarboxylic acid units the polybutylene terephthalate resin (A) is preferably 50 mol % or more, more preferably 70 mol % or more, and further preferably 90 mol % or more. Similarly, the proportion of 1,4-butane diol in the diol units is preferably 50 mol % or more, more preferably 70 mol % or more, and further preferably 90 mol % or more.

In cases where a copolymer is used as the polybutylene terephthalate resin (A), it is preferable for isophthalic acid, a dimer acid, a polyalkylene glycol such as polytetramethylene glycol (PTMG), and the like, to be copolymerized, and of these, it is preferable to use a resin obtained by copolymerizing polytetramethylene glycol. The proportion of the tetramethylene glycol component in the copolymer is preferably 3 to 40 mass %, more preferably 5 to 30 mass %, and further preferably 10 to 25 mass %.

The polybutylene terephthalate resin (A) can be produced by subjecting a dicarboxylic acid component containing terephthalic acid as a primary component, or an ester derivative thereof, and a diol component containing 1,4-butane diol as a primary component to batch type or continuous melt polymerization. In addition, it is also possible to increase the degree of polymerization (or molecular weight) to a desired value by producing a low molecular weight polybutylene terephthalate resin by means of melt polymerization and then carrying out solid state polymerization in a nitrogen stream or under reduced pressure.

The polybutylene terephthalate resin (A) is preferably obtained using a production method involving subjecting a dicarboxylic acid component containing terephthalic acid as a primary component and a diol component containing 1,4-butane diol as a primary component to continuous melt polycondensation.

A catalyst used when carrying out an esterification reaction may be a catalyst that was known in the past, for example a titanium compound, a tin compound, a magnesium compound or a calcium compound. Of these, titanium compounds are particularly preferred. Specific examples of titanium compounds used as esterification catalysts include titanium alcoholates, such as tetramethyl titanate, tetraisopropyl titanate and tetrabutyl titanate; and titanium phenolates such as tetraphenyl titanate.

The amount of terminal carboxyl groups in the polybutylene terephthalate resin (A) should be selected and decided as appropriate, but is generally 60 eq/ton or less, preferably 50 eq/ton or less, and more preferably 30 eq/ton or less. If this amount exceeds 60 eq/ton, gas is readily generated when the resin composition is melt processed, and the hydrolysis resistance of the obtained molded article deteriorates. The lower limit for the amount of terminal carboxyl groups is not particularly limited, but is generally 10 eq/ton in view of productivity when producing the polybutylene terephthalate resin.

Moreover, the amount of terminal carboxyl groups in the polybutylene terephthalate resin is a value measured by dissolving 0.5 g of polyalkylene terephthalate resin in 25 mL of benzyl alcohol, and titrating using a 0.01 mol/L benzyl alcohol solution of sodium hydroxide. A method for adjusting the amount of terminal carboxyl groups should be a conventional publicly known method, such as a method involving adjusting polymerization conditions such as the charging ratios of raw materials when polymerizing, the polymerization temperature or the pressure reduction method, or a method involving reacting a terminal-blocking agent.

The intrinsic viscosity of the polybutylene terephthalate resin (A) is preferably 0.5 to 2 dl/g. From the perspectives of moldability and mechanical properties, it is more preferable for the intrinsic viscosity to fall within the range of 0.6 to 1.5 dl/g. If a resin having an intrinsic viscosity of less than 0.5 dl/g is used, the obtained resin composition tends to have low mechanical strength. In addition, if a resin having an intrinsic viscosity of more than 2 dl/g is used, the fluidity and moldability of the resin composition may deteriorate.

Moreover, the intrinsic viscosity of the polybutylene terephthalate resin (A) is a value measured at 30° C. in a mixed solvent of tetrachloroethane and phenol at a mass ratio of 1:1.

[(B) Brominated Flame Retardants]

The polybutylene terephthalate resin composition of the present invention contains brominated flame retardants. In the present invention, at least two different brominated flame retardants selected from the group consisting of a brominated epoxy compound, a brominated polycarbonate compound and a brominated polystyrene compound are used as the brominated flame retardants (B). Here, the expression "at least two different brominated flame retardants" means (i) using two or three or more different brominated flame retardants selected from the three types of brominated flame retardant mentioned above, (ii) selecting one of the three types of brominated flame retardant mentioned above and using two or three or more such flame retardants having different molecular weights, or (iii) using a combination of (i) and (ii) above.

Specific preferred examples of brominated epoxy compounds include bisphenol A type brominated epoxy compounds such as tetrabromobisphenol A epoxy compounds.

The brominated epoxy compounds are preferably terminally capped with tribromophenol groups, and this is particularly effective in cases where the brominated epoxy compounds have low molecular weights (epoxy compounds that are brominated flame retardant (B1) having a weight average molecular weight of 1000 to 8000, which is described in detail below).

In addition, the brominated epoxy compound preferably has an epoxy equivalent weight of 3000 to 40000 g/eq, more preferably 4000 to 35000 g/eq, and particularly preferably 10000 to 30000 g/eq.

Moreover, the mass average molecular weight (Mw) of the brominated epoxy compound is a value (calculated in terms of polystyrene) measured by means of GPC (gel permeation chromatography). Solvents used when carrying out measurements are THF (tetrahydrofuran) in the case of brominated epoxy compounds, brominated polycarbonate compounds and brominated polystyrene compounds, and ODCB (ortho-dichlorobenzene) in the case of brominated acrylic compounds. The column temperature when carrying out measurements is set to 40° C. in the case of brominated epoxy compounds, brominated polycarbonate compounds and brominated polystyrene compounds, and 135° C. in the case of brominated acrylic compounds.

Specific preferred examples of brominated polycarbonate compounds include brominated polycarbonates obtained from brominated bisphenol A compounds, and especially tetrabromobisphenol A. Examples of terminal structures in such compounds include phenyl groups, 4-t-butylphenyl groups and 2,4,6-tribromophenyl groups, and it is particularly preferable for a terminal structure to have a 2,4,6-tribromophenyl group.

The average number of carbonate repeating units in the brominated polycarbonate compound should be selected and decided as appropriate, but is generally 2 to 30, preferably 3 to 15, and particularly preferably 3 to 10. If the average number of carbonate repeating units is low, a reduction in the molecular weight of the polybutylene terephthalate resin when molten may occur. Conversely, if the average number of carbonate repeating units is high, melt viscosity increases, uneven dispersion in a molded body may occur, and a deterioration in the appearance, and especially glossiness, of the molded article may occur.

A brominated polystyrene can be produced by brominating polystyrene or by polymerizing a brominated styrene monomer, but polymerizing a brominated styrene is preferred from the perspective of the amount of free bromine (atoms) being low.

In addition, a brominated polystyrene may be a copolymer obtained by copolymerizing another vinyl monomer. In such cases, examples of vinyl monomers include styrene, α-methylstyrene, acrylonitrile, methyl acrylate, butadiene and vinyl acetate.

Specific examples of brominated polystyrenes include poly(4-bromostyrene), poly(2-bromostyrene), poly(3-bromostyrene), poly(2,4-dibromostyrene), poly(2,6-dibromostyrene), poly(2,5-dibromostyrene), poly(3,5-dibromostyrene), poly(2,4,6-tribromostyrene), poly(2,4,5-tribromostyrene), poly(2,3,5-tribromostyrene), poly(4-bromo-α-methylstyrene), poly(2,4-dibromo-α-methylstyrene), poly(2,5-dibromo-α-methylstyrene), poly(2,4,6-tribromo-α-methylstyrene) and poly(2,4,5-tribromo-α-methylstyrene), with poly(2,4,6-tribromostyrene), poly(2,4,5-tribromostyrene) and polydibromostyrenes and polytribromostyrenes containing an average of 2 to 3 bromine groups on a benzene ring being particularly preferred.

The brominated flame retardants (B) are preferably a combination of a brominated flame retardant (B1), which is selected from among a brominated epoxy compound and a brominated polycarbonate compound and which has a weight average molecular weight (Mw) of 1000 to 8000, and a brominated flame retardant (B2), which is selected from among a brominated epoxy compound and a brominated polystyrene compound and which has a weight average molecular weight (Mw) of more than 8000 to 70000.

The mass ratio (B1/B2) of the brominated flame retardant (B1) and the brominated flame retardant (B2) is preferably 90/10 to 30/70, more preferably 90/10 to 40/60, and further preferably 90/10 to 50/50. By setting this type of mass ratio, it is possible to further lower the crystallization temperature and further improve the hydrolysis resistance of the obtained resin composition.

It is preferable for at least one of the two or more brominated flame retardants (B) to be a brominated epoxy compound, and more preferable for both of the brominated flame retardants (B1) and (B2) to be brominated epoxy compounds.

The total content of the two or more brominated flame retardants (B) is 30 to 60 parts by mass, preferably 35 parts by mass or more, and more preferably 40 parts by mass or more, and is preferably 55 parts by mass or less, and more preferably 50 parts by mass or less, relative to 100 parts by mass of the polybutylene terephthalate resin (A). If the content of the brominated flame retardants (B) is less than 30 parts by mass, the crystallization temperature increases, boss strength is insufficient and the flame retardancy of the resin composition is insufficient, and if this content exceeds 60 parts by mass, mechanical characteristics and mold-release properties deteriorate, and bleeding out of the flame retardants occurs.

[(C) Antimony Compound]

The polybutylene terephthalate resin composition of the present invention contains an antimony compound (C), which is an auxiliary flame retardant. Examples of the antimony compound (C) include antimony trioxide ($Sb_2O_3$), antimony pentoxide ($Sb_2O_5$) and sodium antimonate. Antimony trioxide is particularly preferred from the perspective of impact resistance.

The content of the antimony compound (C) is 5 to 15 parts by mass, preferably 7 parts by mass or more, and more preferably 8 parts by mass or more, and is preferably 13 parts by mass or less, and more preferably 12 parts by mass or less, relative to 100 parts by mass of the polybutylene terephthalate resin (A). If this content is lower than the lower limit mentioned above, flame retardancy deteriorates. In addition, if this content exceeds the upper limit mentioned above, mechanical strength deteriorates.

The total concentration by mass of bromine atoms derived from the brominated flame retardant (B) and antimony atoms derived from the antimony compound (C) in the polybutylene terephthalate resin composition of the present invention is 3 to 25 mass %, preferably 4 to 22 mass %, more preferably 5 to 20 mass %, and further preferably 10 to 20 mass %. If this total concentration by mass is less than 3 mass %, flame retardancy tends to deteriorate, and if this total concentration by mass exceeds 25 mass %, mechanical strength tends to deteriorate. In addition, the mass ratio of bromine atoms and antimony atoms (Br/Sb) is preferably 0.3 to 5, more preferably 0.3 to 4.5, and further preferably 0.3 to 4. Setting this mass ratio to fall within such a range is preferred because flame retardancy can be readily attained.

In the polybutylene terephthalate resin composition of the present invention, the antimony compound (C) is preferably one that has been formed as a master batch in advance, and is preferably blended as a master batch with a thermoplastic resin, and preferably with the polybutylene terephthalate resin (A). Due to this configuration, the antimony trioxide (C) is more readily present in the polybutylene terephthalate resin (A) phase, thermal stability during melt kneading and molding is improved, a deterioration in impact resistance is suppressed, and variations in flame retardancy and impact resistance tend to be reduced.

It is preferable for the content of the antimony compound (C) in the master batch to be 20 to 90 mass %. In cases where the content of the antimony compound (C) is less than 20 mass %, the proportion of the antimony compound in the flame retardant master batch is low and the flame retardancy improvement effect to be achieved by blending the master batch in the polybutylene terephthalate resin (A) tends to be low. Meanwhile, it is not desirable when the content of the antimony compound (C) exceeds 90 mass %, because dispersibility of the antimony compound (C) tends to deteriorate, the flame retardancy of the resin composition becomes unstable when the antimony compound is blended with the polybutylene terephthalate resin (A), and workability tends to deteriorate when a master batch is produced, and, for example, when a master batch is produced using an extruder, strands are not stable and problems such as snapping readily occur.

The content of the antimony compound (C) in the master batch is preferably 20 to 85 mass %, and more preferably 25 to 80 mass %.

[(D) Elastomer]

The polybutylene terephthalate resin composition of the present invention contains an elastomer (D). The elastomer (D) should be a thermoplastic elastomer used in order to improve the impact resistance of the polybutylene terephthalate resin (A) when blended therein, and is, for example, a rubbery polymer or an elastomer obtained by copolymerizing a rubbery polymer with a compound that reacts with the polymer. The glass transition temperature of the elastomer is preferably 0° C. or lower and especially −20° C. or lower.

Specific examples of the elastomer include polybutadienes, polyisoprenes, diene-based copolymers (styrene-butadiene copolymers, acrylonitrile-butadiene copolymers, acrylic-butadiene rubbers, and the like), copolymers of ethylene and α-olefins having three or more carbon atoms (ethylene-propylene copolymers, ethylene-butene copolymers, ethylene-octene copolymers, and the like), copolymers of ethylene and unsaturated carboxylic acid esters (ethylene-methacrylate copolymers, ethylene-butyl acrylate copolymers, and the like), copolymers of ethylene and aliphatic vinyl compounds, terpolymers of ethylene, propylene and non-conjugated dienes, acrylic rubbers (polybutyl acrylate), poly(2-ethylhexyl acrylate), butyl acrylate-2-ethylhexyl acrylate copolymers, and the like), and silicone-based rubbers (polyorganosiloxane rubbers, IPN type composite rubbers made of polyorganosiloxane rubbers and polyalkyl (meth)acrylate rubbers). It is possible to use one of these elastomers in isolation, or a combination of two or more types thereof.

Moreover, in the present invention, (meth)acrylate means both acrylate and methacrylate, and (meth)acrylic acid means both acrylic acid and methacrylic acid.

The elastomer (D) used in the present invention is preferably a copolymer of an olefin and an unsaturated monomer having an epoxy group or a glycidyl group, or a copolymer obtained by copolymerizing an olefin polymer with an unsaturated monomer having an epoxy group or a glycidyl group. This type of copolymer may be a graft copolymer, a random copolymer or a block copolymer.

In addition, the elastomer may be one in which an epoxy group is introduced by, for example, oxidizing an unsaturated bond, which is present at a terminal of an olefinic copolymer or in a copolymer of an olefin and another unsaturated monomer or the like or a mixture of these, by means of hydrogen peroxide or an organic peroxide such as perbenzoic acid, performic acid or peracetic acid. That is, the elastomer may be one in which an epoxy group or glycidyl group is introduced into an olefinic polymer.

Examples of olefins include ethylene, propylene, 1-butene, isobutylene, 2-butene, cyclobutene, 1-pentene, 1-hexene, 4-methyl-1-pentene, 3-methyl-1-butene, 4-methyl-1-butene, cyclopentene, 1-hexene, cyclohexene, 1-octene, 1-decene and 1-dodecene. It is possible to use one of these olefins in isolation or a combination of two or more types thereof.

Among these olefins, ethylene is particularly preferred, and an ethylenic elastomer is preferred as the elastomer (D).

Examples of unsaturated monomers having an epoxy group or a glycidyl group include glycidyl acrylate, glycidyl methacrylate, vinyl glycidyl ether, allyl glycidyl ether, methacrylic glycidyl ether, 2-methylpropenyl glycidyl ether, styrene-p-glycidyl ether, glycidyl cinnamate, glycidyl itaconate ester and N-[4-(2,3-epoxypropoxy)-3,5-dimethylbenzyl] methacrylamide. It is possible to use one of these unsaturated monomers in isolation or a combination of two or more types thereof. Of these, glycidyl acrylate and glycidyl methacrylate are preferred.

It is preferable for the ethylenic elastomer to be a copolymer obtained by copolymerizing one of these unsaturated monomers having an epoxy group or a glycidyl group with, for example, an unsaturated monomer not having an epoxy group or glycidyl group, such as an alkyl acrylate or alkyl methacrylate.

It is particularly preferable for the ethylenic elastomer to be an ethylene-alkyl acrylate ester-glycidyl methacrylate copolymer.

The content of the elastomer (D) is 5 to 30 parts by mass relative to 100 parts by mass of the polybutylene terephthalate resin (A). If the content of the elastomer is less than 5 parts by mass, the impact resistance and hydrolysis resistance improvement effect tends to be low, and if the content of the elastomer exceeds 30 parts by mass, the strength of a boss part, thermal ageing resistance, rigidity, fluidity and flame retardancy tend to deteriorate. The content of the elastomer is more preferably 7 parts by mass or more, further preferably 10 parts by mass or more, and particularly preferably 16 parts by mass or more, and is more preferably 28 parts by mass or less, further preferably 26 parts by mass or less, and particularly preferably 22 parts by mass or less.

[(E) Mold-Release Agent]

The polybutylene terephthalate resin composition of the present invention further contains a mold-release agent (E). At least one type of compound selected from the group consisting of aliphatic carboxylic acids, esters of aliphatic carboxylic acids and alcohols, aliphatic hydrocarbon compounds having number average molecular weights of 200 to 15000 and polysiloxane-based silicone oils can be used as the mold-release agent (E).

Saturated and unsaturated aliphatic monovalent, divalent and trivalent carboxylic acids can be used as the aliphatic carboxylic acid. Here, aliphatic carboxylic acids also include alicyclic carboxylic acids. Of these, monovalent and divalent carboxylic acids having 6 to 36 carbon atoms are preferred as the aliphatic carboxylic acid, and aliphatic saturated monovalent carboxylic acids having 6 to 36 carbon atoms are more preferred. Specific examples of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid and azelaic acid.

The same aliphatic carboxylic acids as those mentioned above can be used as the aliphatic carboxylic acid in the esters of aliphatic carboxylic acids and alcohols. Meanwhile, saturated and unsaturated monohydric or polyhydric alcohols can be used as the alcohol. These alcohols may have substituent groups such as fluorine atoms or aryl groups. Of these, monohydric and polyhydric saturated alcohols having 30 or fewer carbon atoms are preferred, and aliphatic saturated monohydric and polyhydric alcohols having 30 or fewer carbon atoms are more preferred. Here, aliphatic compounds also include alicyclic compounds. Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentyl glycol, ditrimethylolpropane and dipentaerythritol.

Moreover, the ester compounds mentioned above may contain aliphatic carboxylic acids and/or alcohols as impurities, and may be a mixture of a plurality of compounds.

Specific examples of esters of aliphatic carboxylic acids and alcohols include montanic acid esters, bees wax (a mixture containing mainly myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate and pentaerythritol tetrastearate.

Examples of aliphatic hydrocarbons having number average molecular weights of 200 to 15000 include liquid paraffins, paraffin waxes, micro-waxes, polyethylene waxes, Fischer Tropsch waxes and α-olefin oligomers having 3 to 12 carbon atoms. Here, aliphatic hydrocarbons also include alicyclic hydrocarbons. In addition, these hydrocarbon compounds may be partially oxidized. Of these, paraffin waxes, polyethylene waxes and partially oxidized polyethylene waxes are preferred, and paraffin waxes and polyethylene waxes are more preferred. The number average molecular weight thereof is preferably 200 to 5000. These aliphatic hydrocarbons may be a single substance or a mixture of substances having a variety of constituent components and molecular weights, and the number average molecular weight of the primary component should fall within the range mentioned above.

Examples of polysiloxane-based silicone oils include dimethylsilicone oils, phenylmethylsilicone oils, diphenylsilicone oils and fluorinated alkylsilicones. It is possible to use a combination of two or more types of these.

Of the agents mentioned above, the mold-release agent (E) is preferably a montanic acid ester wax. By using a montanic acid ester wax in particular in the resin composition system of the present invention, the release resistance lowering effect is enhanced and mold-release properties in particular are improved.

The content of the mold-release agent (E) is 0.1 to 3 parts by mass, preferably 0.6 parts by mass or more, and more preferably 1.0 part by mass or more, and is preferably 2.0 parts by mass or less, and more preferably 1.5 parts by mass or less, relative to 100 parts by mass of the polybutylene terephthalate resin (A). If the content of the mold-release agent is not lower than the lower limit mentioned above, the release improvement effect can be sufficiently achieved, and if the content of the mold-release agent is not higher than the upper limit mentioned above, it is possible to prevent problems such as a deterioration in hydrolysis resistance and mold contamination during injection molding, which can be caused by an excess of the mold-release agent.

[Epoxy Compound]

The polybutylene terephthalate resin composition of the present invention preferably contains an epoxy compound. Because the epoxy compound suppresses a deterioration in mechanical strength and the like when the polybutylene terephthalate resin undergoes hydrolysis caused by water vapor or the like, which causes a reduction in molecular weight, incorporating the epoxy compound is preferred because the effect achieved by blending the elastomer (D) is facilitated and hydrolysis resistance and heat shock resistance can be significantly improved.

The epoxy compound should have one or more epoxy groups per molecule, and a glycidyl compound that is a product of a reaction between epichlorohydrin and an alcohol, phenol compound or carboxylic acid, or the like, or a compound obtained by epoxidation of an olefinic double bond should generally be used. However, the epoxy compound cannot be the brominated epoxy compound or epoxy group-containing elastomer mentioned above.

Examples of the epoxy compound include bisphenol A type epoxy compounds, bisphenol F type epoxy compounds, resorcin type epoxy compounds, novolac type epoxy compounds, alicyclic epoxy compounds, glycidyl ether compounds, glycidyl ester compounds and epoxidated butadiene polymers.

Examples of bisphenol A type epoxy compounds include bisphenol A diglycidyl ether and hydrogenated bisphenol A diglycidyl ether, examples of bisphenol F type epoxy compounds include bisphenol F diglycidyl ether and hydrogenated bisphenol F diglycidyl ether, and examples of resorcin type epoxy compounds include resorcin diglycidyl ether.

In addition, examples of novolac type epoxy compounds include phenol novolac type epoxy resins and cresol novolac type epoxy resins.

Examples of alicyclic epoxy compounds include vinylcyclohexene oxide, dicyclopentadiene oxide, 3,4-epoxycyclohexyl-3,4-cyclohexyl carboxylate, bis(3,4-epoxycyclohexylmethyl) adipate, vinylcyclohexene diepoxide and 3,4-epoxycyclohexyl glycidyl ether.

Examples of glycidyl ether compounds include monoglycidyl ether compounds such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether and allyl glycidyl ether; and diglycidyl ether compounds such as neopentyl glycol diglycidyl ether, ethylene glycol diglycidyl ether, glycerin diglycidyl ether, propylene glycol diglycidyl ether and bisphenol A diglycidyl ether. In addition, examples of glycidyl ester compounds include monoglycidyl ester compounds such as glycidyl benzoic acid esters and glycidyl sorbic acid esters; and diglycidyl ester compounds such as diglycidyl adipic acid esters, diglycidyl terephthalic acid esters, diglycidyl orthophthalic acid esters.

Examples of epoxidized butadiene polymers include epoxidized polybutadienes, epoxidized styrene-butadiene-based copolymers and epoxidized hydrogenated styrene-butadiene-based copolymers.

In addition, the epoxy compound may be a copolymer containing a glycidyl group-containing compound as one component. Examples thereof include copolymers of glycidyl esters of α,β-unsaturated acids and one or two or more monomers selected from the group consisting of α-olefins, acrylic acid, acrylic acid esters, methacrylic acid and methacrylic acid esters.

In addition, an epoxy compound having an epoxy equivalent weight of 100 to 10000 g/eq and a mass average molecular weight 8000 or less is preferred as the epoxy compound. If the epoxy equivalent weight is less than 100 g/eq, the viscosity of the resin composition increases because the amount of epoxy groups is too high, but if the epoxy equivalent weight exceeds 10000 g/eq, the amount of epoxy groups is few, meaning that it tends to be difficult to adequately exhibit the effect of improving the hydrolysis resistance and heat shock resistance of the thermoplastic polyester resin composition. The epoxy equivalent weight is more preferably 300 to 7000 g/eq, and further preferably 500 to 6000 g/eq. In addition, if the mass average molecular weight exceeds 8000, compatibility with the thermoplastic polyester resin decreases and the mechanical strength of a molded article tends to deteriorate. The mass average molecular weight is more preferably 7000 or less, and further preferably 6000 or less.

Relative to 100 parts by mass of the polybutylene terephthalate resin (A), the content of the epoxy compound is preferably 0.1 to 2 parts by mass, more preferably 0.2 parts by mass or more, further preferably 0.3 parts by mass or more, and particularly preferably 0.4 parts by mass or more. In addition, the content of the epoxy compound is more preferably 1.5 parts by mass or less, further preferably 1.4 parts by mass or less, and particularly preferably 1.3 parts by mass or less. Hydrolysis resistance tends to deteriorate if the content of the epoxy compound is less than 0.1 parts by mass, and crosslinking tends to progress and flowability during molding tends to deteriorate if the content of the epoxy compound exceeds 2 parts by mass.

Furthermore, the equivalence ratio of epoxy groups in the epoxy compound relative to terminal COOH groups in the thermoplastic polyester resin (A) (epoxy groups/COOH groups) preferably falls within the range of 0.2 to 2.7. Hydrolysis resistance tends to deteriorate if this equivalence ratio is lower than 0.2, and molding properties tend to become unstable if this equivalence ratio exceeds 2.7. The epoxy group/COOH group ratio is more preferably 0.3 to 2.5.

[Inorganic Filler]

The polybutylene terephthalate resin composition of the present invention preferably contains an inorganic filler, and the content of the filler preferably falls within the range of 30 to 100 parts by mass relative to 100 parts by mass of the polybutylene terephthalate resin (A). The content of the inorganic filler is more preferably 40 parts by mass or more, and further preferably 50 parts by mass or more, and is more preferably 90 parts by mass or less, and further preferably 80 parts by mass or less.

In the present invention, the inorganic filler is a component that is incorporated in the resin component in order to improve strength and rigidity, and the inorganic filler may be fibrous, lamellar, granular or amorphous.

In cases where the inorganic filler is fibrous, the fibers may be inorganic or organic. For example, it is possible to use inorganic fibers such as glass fibers, carbon fibers, silica.alumina fibers, zirconia fibers, boron fibers, boron nitride fibers, silicon nitride fibers, potassium titanate fibers, metal fibers or wollastonite fibers, or organic fibers such as fluororesin fibers or aramid fibers. In cases where the inorganic filler is fibrous, inorganic fibers are preferred, and among these, glass fibers are particularly preferred. It is possible to use one type of inorganic filler or a mixture of two or more types thereof.

In cases where the inorganic filler is fibrous, the average fiber diameter, average fiber length and cross-sectional shape of the fibers are not particularly limited, but the average fiber diameter is preferably selected within the range of, for example, 1 to 100 μm, and the average fiber length is preferably selected within the range of, for example, 0.1 to 20 mm. The average fiber diameter is preferably 1 to 50 μm, and more preferably approximately 5 to 20 μm. In addition, the average fiber length is preferably approximately 0.12 to 10 mm. In addition, in cases where the fiber cross-sectional shape is flat, such as oval, elliptical, or cocoon shape, the flatness (the long axis/short axis ratio) is preferably 1.4 to 10, more preferably 2 to 6, and further preferably 2.5 to 5. Using glass fibers having this type of heteromorphic cross-sectional shape is preferred because warping of a molded article and dimensional stability such as shrinkage anisotropy can easily be improved.

It is possible to incorporate another type of lamellar, granular or amorphous inorganic filler in addition to the fibrous inorganic filler mentioned above. Lamellar inorganic fillers exhibit the function of reducing anisotropy and warping, and examples thereof include glass flakes, talc, mica, kaolin and metal foils. Glass flakes are preferred among these lamellar inorganic fillers.

Examples of other types of granular and amorphous inorganic fillers include ceramic beads, asbestos, clays, zeolites, potassium titanate, barium sulfate, titanium oxide, silicon oxide, aluminum oxide and magnesium hydroxide.

Moreover, in order to improve adhesion at an interface between the inorganic filler and the resin component, it is preferable to treat the surface of the inorganic filler with a surface treatment agent such as a sizing agent. Examples of surface treatment agents include epoxy resins, acrylic resins, urethane resins and functional compounds such as isocyanate compounds, silane compounds and titanate compounds.

In the present invention, it is preferable to use an epoxy resin for surface treatment. Preferred epoxy resins include novolac type epoxy resins, such as phenol novolac type epoxy resins and cresol novolac type epoxy resins, and bisphenol A type epoxy resins. Of these, it is preferable to use a combination of a novolac type epoxy resin and a bisphenol type epoxy resin, and using a combination of a phenol novolac type epoxy resin and a bisphenol A type epoxy resin is preferred from the perspectives of alkali resistance, hydrolysis resistance and mechanical characteristics.

Preferred functional compounds include silane coupling agents such as aminosilane compounds, epoxysilane compounds, allylsilane compounds and vinylsilane compounds, and of these, aminosilane compounds are preferred.

Preferred aminosilane compounds include γ-aminopropyltriethoxysilane, γ-aminopropyltrimethoxysilane, γ-glycidoxypropyltrimethoxysilane and γ-(2-aminoethyl)aminopropyltrimethoxysilane, and of these, γ-aminopropyltriethoxysilane and γ-glycidoxypropyltrimethoxysilane are preferred.

In the present invention, it is particularly preferable to use a novolac type epoxy resin and a bisphenol type epoxy resin as so-called sizing agents and also use an inorganic filler that has been surface treated with an aminosilane compound as a coupling agent from the perspective of hydrolysis resistance. By constituting a surface treatment agent in this way, inorganic functional groups in the aminosilane compound exhibit high reactivity at the surface of the inorganic filler and organic functional groups in the aminosilane exhibit high reactivity with glycidyl groups in the epoxy resin, and glycidyl groups in the epoxy resin react to a reasonable degree with the polybutylene terephthalate resin (A), thereby enabling an improvement in interfacial adhesive strength between the inorganic filler and the epoxy resin. As a result, it is thought that the hydrolysis resistance and mechanical characteristics of the resin composition of the present invention tend to be improved.

In addition, it is possible to incorporate urethane resins, acrylic resins, anti-static agents, lubricants, water-repelling agents, and the like, in the surface treatment agent as long as the gist of the present invention is not deviated from, and in cases where these other components are contained, it is preferable to use a urethane resin.

The inorganic filler can be surface treated using a conventional publicly known method, such as surface treating in advance using a surface treatment agent mentioned above or adding a surface treatment agent separately from the untreated inorganic filler when preparing the polybutylene terephthalate resin composition of the present invention.

The coating weight of the surface treatment agent on the inorganic filler is preferably 0.01 to 5 mass %, and more preferably 0.05 to 2 mass %. By making this coating weight 0.01 mass % or more, mechanical strength tends to be more effectively improved, and by making this coating weight 5 mass % or less, the required effect can be satisfactorily achieved and production of the resin composition tends to be facilitated.

[Carbon Black]

The polybutylene terephthalate resin composition of the present invention preferably contains carbon black.

The carbon black is not limited in terms of type, raw material or production method, and it is possible to use furnace black, channel black, acetylene black, ketjen black, or the like. The number average particle diameter of the carbon black is not particularly limited, but is preferably approximately 5 to 60 nm.

The content of carbon black is preferably 0.1 to 4.0 parts by mass, and more preferably 0.2 to 3.0 parts by mass, relative to 100 parts by mass of the polybutylene terephthalate resin (A). If this content is less than 0.1 parts by mass, the desired color cannot be achieved and a weathering resistance improvement effect may not be sufficient, and if this content exceeds 4.0 parts by mass, mechanical properties tend to deteriorate.

Moreover, it is preferable for the carbon black to be blended as a master batch that contains a high concentration of carbon black in advance in order to increase handling properties when producing the resin composition and increase dispersion uniformity in the resin composition. In such cases, a resin used in the carbon black master batch may be the polybutylene terephthalate resin (A), but may also be a resin other than this, such as a polycarbonate resin, a polyethylene terephthalate resin, a styrenic resin (for example, an AS resin or the like), a polyethylene resin, or the like. From the perspectives of facilitating dispersion of highly concentrated carbon black and facilitating formation of a master batch, it is preferable to use the polybutylene terephthalate resin (A) or a styrenic resin. Of these, use of a styrenic resin is preferred from the perspective of blackness.

The carbon black concentration in the carbon black master batch is generally approximately 10 to 60 mass %.

[Stabilizer]

It is preferable for the polybutylene terephthalate resin composition of the present invention to further contain a stabilizer from the perspectives of improving thermal stability and preventing a deterioration in mechanical strength and hue. Phosphorus stabilizers and phenolic stabilizers are preferred as the stabilizer.

Examples of phosphorus stabilizers include phosphorus acid, phosphoric acid, phosphorus acid esters (phosphites), trivalent phosphoric acid esters (phosphonites) and pentavalent phosphoric acid esters (phosphates), and of these, phosphites, phosphonites and phosphates are preferred.

Examples of phosphites include triphenyl phosphite, tris (nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenylmonodecyl phosphite, monophenyldidecyl phosphite, diphenylmono(tridecyl) phosphite, tetraphenyldipropylene glycol diphosphite, tetraphenyltetra(tridecyl)pentaerythritol tetraphosphite, hydrogenated bisphenol A phenyl phosphite polymers, diphenyl hydrogen phosphite, 4,4'-butylidene-bis(3-methyl-6-tert-butylphenyldi(tridecyl) phosphite), tetra(tridecyl)4,4'-isopropylidene diphenyl diphosphite, bis(tridecyl)pentaerythritol diphosphite, bis(nonylphenyl)pentaerythritol diphosphite, dilaurylpentaerythritol diphosphite, distearylpentaerythritol diphosphite, tris(4-tert-butylphenyl) phosphite, tris(2,4-di-tert-butylphenyl) phosphite, hydrogenated bisphenol A pentaerythritol phosphite polymers, bis(2,4-di-tert-butylphenyl)pentaerythritol diphosphite, bis(2,6-di-tert-butyl-4-methylphenyl)pentaerythritol diphosphite, 2,2'-methylene-bis(4,6-di-tert-butylphenyl)octyl phosphite and bis(2,4-dicumylphenyl)pentaerythritol diphosphite.

In addition, examples of phosphonites include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite.

In addition, examples of phosphates include methyl acid phosphate, ethyl acid phosphate, propyl acid phosphate, isopropyl acid phosphate, butyl acid phosphate, butoxyethyl acid phosphate, octyl acid phosphate, 2-ethylhexyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphates, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bis(nonylphenyl) acid phosphate.

It is possible to incorporate one phosphorus stabilizer or an arbitrary combination of two or more types thereof combined at arbitrary proportions.

Specific examples of phenolic stabilizers include pentaerythritol tetrakis[3-(3,5-di-tert-butyl-4-hydroxyphenyl) propionate], octadecyl-3-(3,5-di-tert-butyl-4-hydroxyphenyl) propionate, thiodiethylene-bis[3-(3,5-di-tert-butyl-4-hydroxyphenyl) propionate], N,N'-hexane-1,6-diyl-bis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene-bis(oxyethylene)-bis[3-(5-tert-butyl-4-hydroxy-m-tolyl) propionate], hexamethylene-bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazine-2-ylamino)phenol.

Of these, pentaerythritol tetrakis[3-(3,5-di-tert-butyl-4-hydroxyphenyl) propionate] and octadecyl-3-(3,5-di-tert-butyl-4-hydroxyphenyl) propionate are preferred.

Moreover, it is possible to incorporate one phenolic stabilizer or an arbitrary combination of two or more types thereof combined at arbitrary proportions.

The content of the stabilizer is generally 0.001 parts by mass or higher and preferably 0.01 parts by mass or higher, and is generally 1.5 parts by mass or lower and preferably 1 part by mass or lower, relative to 100 parts by mass of the polybutylene terephthalate resin (A). If the content of the stabilizer is less than 0.001 parts by mass, the effect of the stabilizer is insufficient and a decrease in molecular weight and a deterioration in hue readily occur when the composition is molded, and if the content of the stabilizer exceeds 1.5 parts by mass, the quantity thereof becomes excessive, silvering occurs, and a deterioration in hue readily occurs.

[Other Components]

The polybutylene terephthalate resin composition of the present invention may further contain a variety of additives as long as the advantageous effect of the present invention is not significantly impaired. Examples of such additives include anti-dripping agents, ultraviolet radiation absorbers, dyes and pigments, fluorescent brightening agents, anti-static agents, anti-fogging agents, lubricants, anti-blocking agents, fluidity improving agents, plasticizers, dispersing agents and antimicrobial agents.

In addition, the polybutylene terephthalate resin composition of the present invention may contain a thermoplastic resin other than the resins mentioned above as long as the advantageous effect of the present invention is not impaired.

Specific examples of other thermoplastic resins include poly(ethylene terephthalate) resins, polycarbonate resins, polyacetal resins, polyamide resins, polyphenylene oxide resins, polystyrene resins, polyphenylene sulfide-ethylene resins, polysulfone resins, polyethersulfone resins, polyetherimide resins, polyetherketone resins and polyolefin resins.

[Crystallization Temperature]

By containing at least two different brominated flame retardants (B) selected from the group consisting of a brominated epoxy compound, a brominated polycarbonate compound and a brominated polystyrene compound the polybutylene terephthalate resin composition of the present invention has a low crystallization temperature (Tc), and the crystallization temperature is preferably 193° C. or lower, more preferably 192° C. or lower, and further preferably 191° C. or lower, and within this range, a crystallization temperature of 190° C. or lower, and especially 189° C. or lower, is preferred. In addition, the lower limit of the Tc value is preferably 170° C., more preferably 175° C., and further preferably 180° C.

By specifying such a crystallization temperature, a resin tends to be sufficiently filled in a boss part before the resin solidifies and boss strength can be increased.

Moreover, in the present invention, the crystallization temperature (Tc) is the peak top temperature of an exothermic peak observed when using a differential scanning calorimeter (DSC) to decrease and increase the temperature of a resin composition or molded body thereof in a nitrogen atmosphere by increasing the temperature from 30° C. to 300° C. at a rate of 20° C./min, holding at 300° C. for 3 minutes, and then decreasing the temperature at a rate of 20° C./min.

[Method for Producing Resin Composition]

The method for producing the polybutylene terephthalate resin composition of the present invention includes thoroughly mixing the components and a variety of additives that are added according to need, and then melt kneading using a single screw or twin screw extruder. It is also possible to produce the resin composition of the present invention by not pre-mixing the components or pre-mixing only some of the components, and then supplying to an extruder by means of a feeder and carrying out melt kneading. Furthermore, it is possible to mix a part of the polybutylene terephthalate resin with some of the other components, melt knead this mixture so as to prepare a master batch, and then blend the remaining polybutylene terephthalate resin and other components with the master batch and carry out melt kneading. Moreover, in cases where a fibrous substance such as glass fibers is used as an inorganic filler, it is preferable to supply the filler from a side feeder located part of the way along the cylinder of the extruder.

In addition, it is preferable to use the antimony compound (C) as a master batch prepared in advance from the perspectives of thermal stability during melt kneading and molding and variations in flame retardancy and impact resistance, as mentioned above. The method for producing a master batch is not particularly limited, but an example thereof is a method of melt kneading a thermoplastic resin, and preferably a polybutylene terephthalate resin, with an antimony compound using an extruder such as a twin screw extruder. Furthermore, it is possible to blend a variety of additives, such as a stabilizer, if necessary when preparing the master batch.

In addition, the melting temperature of the resin composition during the melt kneading is preferably 180° C. to 350° C., and more preferably 190° C. to 320° C. If the melting temperature is lower than 180° C., melting is insufficient and a large quantity of unmolten gel tends to be produced, but if the melting temperature exceeds 350° C., the resin composition thermally degrades and tends to become discolored.

[Molded article]

The polybutylene terephthalate resin composition of the present invention is generally used as a molded article formed into an arbitrary shape. The shape, pattern, color, dimensions, and the like, of the molded article are not limited, and should be specified arbitrarily according to the intended use of the molded article.

The method for producing a molded article is not particularly limited, and any molding method commonly used for polybutylene terephthalate resin compositions can be used. Examples thereof include injection molding methods, ultra high-speed injection molding methods, injection compression molding methods, two-color molding methods, hollow molding methods such as gas-assisted methods, molding methods that use heat insulating molds, molding methods that use rapidly heated molds, foaming molding methods (including supercritical fluids), insert molding methods, IMC (in-mold coating) molding methods, extrusion molding methods, sheet molding methods, thermoforming methods, rotational molding methods, lamination molding methods, press molding methods and blow molding methods, and of these, injection molding methods are preferred.

An injection molding method will now be explained.

Drying conditions prior to injection molding are a drying temperature of 100° C. to 180° C. and a drying time of 1 to 36 hours. It is more preferable for the drying temperature range to be 120° C. to 160° C. and the drying time range to be 4 to 24 hours. The drying step is preferably carried out in a vacuum, but another type of atmosphere can also be used. For example, the drying step may be carried out in an inert gas atmosphere or an air atmosphere, and the drying method in the drying step is not particularly limited. A conventional publicly known dryer or the like should be used. In addition, in cases where the drying step is carried out in a vacuum, a dryer such as a vacuum dryer should be used.

By increasing the drying temperature or lengthening the drying time, the moisture content in the polybutylene terephthalate resin composition decreases, the number of voids generated in boss parts decreases, and boss strength therefore tends to increase. However, because the polybutylene terephthalate resin or this resin undergoes oxidative degradation if the drying temperature is excessively high or the drying time is excessively long, the ranges mentioned above are preferred.

In addition, the moisture content in the resin composition prior to injection molding is preferably 500 ppm or less, more preferably 300 ppm or less, further preferably 200 ppm or less, and particularly preferably 100 ppm or less. If the moisture content exceeds 500 ppm, voids tend to be generated in boss parts and boss part strength tends to decrease. In addition, hydrolysis resistance also tends to decrease.

When molding the composition, it is preferable for the cylinder temperature to be lower than 280° C. and the cooling time to be less than 40 seconds. By setting a low cylinder temperature, gas generation is suppressed, the number of voids generated in boss parts decreases, and boss strength tends to increase. In addition, by setting a short cooling time, the amount of gas generated during molding decreases and boss strength tends to increase. In particular, it is preferable to adjust the cylinder temperature within the range of not lower than 240° C. and lower than 270° C. and adjust the cooling time within the range of not less than 5 seconds and less than 30 seconds.

The holding pressure value during injection molding is preferably 50% to 100% of the injection peak pressure. From the perspectives of moldability and mechanical characteristics, the holding pressure value is more preferably 60% to 90% of the injection peak pressure. If the holding pressure value is less than 50% of the injection peak pressure, boss strength tends to be low. In addition, if the holding pressure value is higher than 100% of the injection peak pressure, the polybutylene terephthalate resin material becomes over-filled, and mold-release properties may deteriorate.

The polybutylene terephthalate resin composition of the present invention generates few internal voids in and around boss parts when boss parts are provided in a molded article, exhibits excellent boss part strength, and exhibits excellent flame retardancy, mold-release properties and hydrolysis resistance, and is therefore particularly suitable for use in electrical equipment, electronic devices and insulating components of these, and can be advantageously used in relay cases, variable capacitor cases, capacitor cases, power module cases, intelligent power module cases, and the like, and also in vehicular electric components and housings and cases thereof, such as engine control unit (ECU) cases, engine computer unit cases, ABS unit cases and airbag control units.

Such vehicular electric components (and housings and cases thereof) require mounting circuit boards and the like to be waterproof due to the possibility of exposure to water, and are therefore preferably coated by means of resin sealing (resin molding), and are preferably sealed by providing a flexible silicone resin-based sealing agent layer on a surface.

The connector connection port for external connection of the present invention is a connector connection port which is used for inserting and connecting an external connector in an electronic device, wherein the connector connection port is formed of a molded body obtained by injection molding of a polybutylene terephthalate resin material, and a boss part is provided in a protruding form on the outer peripheral surface or inner peripheral surface of the connector connection port, voids are present in the polybutylene terephthalate resin material in the boss part and the lower part of the outer peripheral surface or inner peripheral surface on which the boss part is provided in a protruding form, and when the sum total of the cross-sectional areas of voids which are present in a region lying at a height of 0 to 0.5 mm from the outer peripheral surface or inner peripheral surface in the boss part is denoted by S1, the sum total of the cross-sectional areas of voids which are present in a region lying at a depth of 0 to 0.5 mm from the outer peripheral surface or inner peripheral surface on which the boss part is provided in a protruding form is denoted by S2, and the total area of S1 and S2 is taken to be 100%, the areal ratio of S1 is 5% to 45% and the areal ratio of S2 is 55% to 95%.

The connector connection port for external connection of an electronic device of the present invention is provided in, for example, a vehicular electronic device, and especially an engine control unit (ECU) or the like, is provided at the front end of an electronic control device housing that houses an electronic component or a circuit board, and is used for fitting and connecting to an external connector.

FIG. 1 is a perspective view of an engine control unit that is an example of an electronic device.

An engine control unit 1 is provided with a housing case 2 and connector parts 3 for external connection. The connector parts 3 for external connection are formed of a molded body obtained by molding a polybutylene terephthalate resin material by means of injection molding. The housing case 2 may be a molded product of a resin material such as a polybutylene terephthalate resin or a metal such as aluminum. A base 2' at the bottom of the housing case 2 is generally a metal such as aluminum, but may be a molded product of a resin material such as a polybutylene terephthalate resin.

The housing case 2 and the housing base 2' thereof are fixed by means of screws at corners or by means of thermal caulking.

A wide variety of electronic components can be housed inside the engine control unit 1, and a circuit board or the like having an electronic component mounted thereon is fixed to the housing base 2'.

The connector parts 3 for external connection are present on the side surface of the engine control unit 1, a plurality of connector connection ports 4 for external connection are provided, which enable external connector plugs (not shown) to be inserted and connected, and connector pins 5 are present, which are connected to terminals on the external connector plug side when the external connector plugs are inserted into the connector connection ports.

The connector part A for external connection is produced by injection molding as an integrated product such as A shown in FIG. 1 from a polybutylene terephthalate resin material. In addition, the plurality of connector connection ports 4 for external connection generally have a rectangular shape, as shown in FIG. 1, but a boss part 6 is provided on the outer peripheral surface or inner peripheral surface thereof. The boss part 6 is used for hook fastening in order to sufficiently ensure connection of an external connector plug (not shown) to a connector connection port 4 without being affected by vehicle movement or vibrations from the engine. Therefore, it is extremely important for the boss part 6 to exhibit high boss strength.

The shape of the boss part 6 is generally a circular cylinder, but can be a circular cylinder having a part cut out, a square column, or the like. The size of the boss part 6 is such that the diameter is generally approximately 2 to 4 mm and the height is generally approximately 2 to 4 mm. It is preferable for the tip of the boss part 6 to have an umbrella-like shape for the purposes of hook fastening.

The connector part 1 for external connection has a complex shape such as that shown in FIG. 1, and it is difficult to ensure sufficient boss strength by injection molding of a polybutylene terephthalate resin material using a conventional method, such as sufficiently improving the flowability of the resin during molding. In cases where filling boss parts with a polybutylene terephthalate resin material was difficult when injection molding a polybutylene terephthalate resin material into this type of shape, it was clear that voids were readily formed due to the resin solidifying before being adequately filled in the boss parts, thereby causing boss strength to deteriorate.

FIG. 3 is a schematic diagram that shows the distribution of voids in a cross section of a boss part and a portion below the boss part in a test piece with boss part, which is used in the examples and comparative examples. FIG. 3(a) shows the distribution of voids in a example having high boss strength, with the circles in the diagram being voids. In FIG. 3, the line indicated by B-B is a flat surface from which a boss part protrudes, with the boss part being above the line indicated by B-B and a base part being below the line indicated by B-B. It can be seen that the distribution of voids is low in the boss part above the line and higher in the lower region (base part). Meanwhile, in the comparative example shown in FIG. 3(b), it can be seen that the distribution of voids is high in the boss part above the line and lower in the lower part (base part).

In the present invention, voids which are present in the polybutylene terephthalate resin material in the boss part and the outer peripheral surface or inner peripheral surface below the boss part are configured such that, when the sum total of the cross-sectional areas of voids which are present in a region lying at a height of 0 to 0.5 mm from the outer peripheral surface or inner peripheral surface in the boss part is denoted by S1, the sum total of the cross-sectional areas of voids which are present in a region lying at a depth of 0 to 0.5 mm from the outer peripheral surface or inner peripheral surface below the boss part is denoted by S2, and the total area of S1 and S2 is taken to be 100%, the areal ratio of S1 is 5% to 45% and the areal ratio of S2 is 55% to 95%, thereby enabling a boss part having extremely high boss strength to be obtained.

Within the ranges mentioned above, the areal ratio of S1 and the areal ratio S2 are preferably such that the areal ratio of S1 is 5% to 43% and the areal ratio of S2 is 57% to 95%, and more preferably such that the areal ratio of S1 is 5% to 40% and the areal ratio of S2 is 60% to 95%.

Moreover, S1 and S2 are measured in a cross section that includes the center line in the direction of protrusion of the boss part, which is, for example, a cross section that includes the center of a cross section of a circular cylinder in cases where the protrusion has the shape of a circular cylinder or a cross section that includes the geometric center in cases where the protrusion has the shape of a semicircle, and the specific measurement method is as disclosed in the examples.

This range for the areal ratio of voids in the boss part and the portion below the boss part can be achieved by using a polybutylene terephthalate resin material such as that described below, setting the drying conditions prior to injection molding to be a drying temperature of 100° C. to 180° C. and a drying time of 1 to 36 hours, setting the moisture content in the resin composition prior to injection molding to be 500 ppm or less, and adjusting the cylinder temperature and holding pressure during injection molding, as described below, and this is a particularly preferred production method.

The polybutylene terephthalate resin material used in the connector connection port is preferably a polybutylene terephthalate resin composition that contains at least one type selected from the group consisting of an epoxy compound, a brominated epoxy compound and an epoxy group-containing elastomer, and is preferably a polybutylene terephthalate resin composition that contains at least two different brominated flame retardants selected from the group consisting of a brominated epoxy compound, a brominated polycarbonate compound and a brominated polystyrene compound, and the polybutylene terephthalate resin composition described above can be used particularly advantageously.

A connector connection port having a boss part is formed by injection molding of the polybutylene terephthalate resin material.

The connector connection port of the present invention is used for inserting and connecting external connectors in electronic devices (including electrical equipment), and electronic/electrical devices, such as relay cases, variable capacitor cases, capacitor cases, power module cases, intelligent power module cases, and vehicular electric components and housings and cases thereof, such as engine control unit (ECU) cases, engine computer unit cases, ABS unit cases and airbag control units, can be given as a preferred examples of electronic devices.

Drying conditions prior to injection molding are a drying temperature of 100° C. to 180° C. and a drying time of 1 to 36 hours. It is more preferable for the drying temperature range to be 120° C. to 160° C. and the drying time range to be 4 to 24 hours. The drying step is preferably carried out in a vacuum, but another type of atmosphere can also be used. For example, the drying step may be carried out in an inert gas atmosphere or an air atmosphere, and the drying method in the drying step is not particularly limited. A conventional publicly known dryer or the like should be used. In addition, in cases where the drying step is carried out in a vacuum, a dryer such as a vacuum dryer should be used.

By increasing the drying temperature or lengthening the drying time, the moisture content in the polybutylene terephthalate resin material decreases and the number of voids generated in boss parts tends to decrease. In addition, by lowering the value of S1, the value of S1/S2 tends to fall within the range of 5/95 to 45/55. However, because the polybutylene terephthalate resin or this resin undergoes oxidative degradation if the drying temperature is excessively high or the drying time is excessively long, the ranges mentioned above are preferred.

The moisture content in the polybutylene terephthalate resin material prior to injection molding is preferably 500 ppm or less, more preferably 300 ppm or less, further preferably 200 ppm or less, and particularly preferably 100 ppm or less. If the moisture content exceeds 500 ppm, voids tend to be generated in boss parts and boss strength tends to decrease. In addition, by increasing the value of S1, the value of S1/S2 tends to fall within the range of 45/55 or higher. In addition, hydrolysis resistance also tends to decrease.

When molding the composition, it is preferable for the cylinder temperature to be lower than 280° C. and the cooling time to be less than 40 seconds. By setting a low cylinder temperature, gas generation is suppressed, the number of voids generated in boss parts decreases, and boss strength tends to increase. In addition, by lowering the value of S1, the value of S1/S2 tends to fall within the range of 5/95 to 45/55. By setting a short cooling time, the amount of gas generated during molding decreases and boss strength tends to increase. In particular, it is preferable to adjust the cylinder temperature within the range of not lower than 240° C. and lower than 270° C. and adjust the cooling time within the range of not less than 5 seconds and less than 30 seconds.

The holding pressure value during injection molding is preferably 50% to 100% of the injection peak pressure. From the perspectives of moldability and mechanical characteristics, the holding pressure value is more preferably 60% to 90% of the injection peak pressure. If the holding pressure value is less than 50% of the injection peak pressure, the boss strength of the obtained polybutylene terephthalate resin material tends to be low, and by increasing the value of S1, the value of S1/S2 tends to fall within the range of 45/55 or higher. In addition, if the holding pressure value is higher than 100% of the injection peak pressure, the polybutylene terephthalate resin material becomes over-filled, and mold-release properties may deteriorate.

The boss strength of the connector connection port for external connection of the present invention is preferably 300 N or more, more preferably 310 N or more, and further preferably 320 N or more.

EXAMPLES

The present invention will now be explained in greater detail through the use of examples. However, it should be understood that the present invention is not limited to the examples given below.

Moreover, in the explanations given below, the term "part(s)" means "part(s) by mass" on a mass basis unless explicitly stated otherwise.

The components used in the examples and comparative examples below are as shown in Table 1 below.

TABLE 1

| Component | Symbol | |
|---|---|---|
| (A) PBT resin | 5007 | Mitsubishi Engineering-Plastics Corporation Product name: NOVADURAN ® 5008 Intrinsic viscosity: 0.70 dl/g |
| | 5008 | Mitsubishi Engineering-Plastics Corporation Product name: NOVADURAN ® 5008 Intrinsic viscosity: 0.85 dl/g |
| | 5020 | Mitsubishi Engineering-Plastics Corporation Product name: NOVADURAN ® 5020 Intrinsic viscosity: 1.20 dl/g |

TABLE 1-continued

| Component | Symbol | |
|---|---|---|
| | 5510 | Mitsubishi Engineering-Plastics Corporation<br>Product name: NOVADURAN ® 5510<br>Intrinsic viscosity: 1.03 dl/g<br>Copolymer containing 20 wt. % of copolymerized polytetramethylene glycol |
| (B1-1)<br>Brominated<br>Epoxy | ECX-30 | Tetrabromobisphenol A-based epoxy compound<br>from DIC Corporation, product name: ECX-30,<br>bromine concentration: 58%<br>Mw: 3800, tribromophenol-capped |
| (B1-2)<br>Brominated<br>Polycarbonate | FR-53 | Brominated polycarbonate<br>from Mitsubishi Gas Chemical Company<br>product name: FR-53, bromine concentration: 58%<br>Mw: 2170, free bromine content: 0.11 mass %<br>Chlorine compound content: 0.02 mass % |
| (B2-1)<br>Brominated<br>Epoxy | CXB3000H | Tetrabromobisphenol A-based epoxy compound<br>from Woojin Copolymer<br>Product name: CXB3000H<br>Bromine concentration: 52%, Mw: 26,000 |
| (B2-2)<br>Brominated<br>Polystyrene | PBS-64HW | Brominated polystyrene<br>(polymer of brominated styrene monomer)<br>From Chemtura Japan Ltd.,<br>Product name: PBS-64HW<br>Bromine concentration: 64%, Mw: 60,000 |
| (BX)<br>Brominated<br>Acrylic | FR1025 | Pentabromobenzyl polyacrylate<br>Available from ICL, product name: FR1025<br>Bromine concentration: 70%, Mw: 31,000 |
| (C)<br>Antimony | GMA | Antimony trioxide<br>Available from Yamanaka Industry Co., Ltd.,<br>Product name: GMA<br>Antimony concentration: 83.5 mass % |
| (D)<br>Elastomer | AX8900 | Ethylene-methyl acrylate-glycidyl methacrylate copolymer<br>From Arkema, product name: Lotader GMA |
| | M711 | Core-shell type graft copolymer consisting of<br>core comprising butadiene rubber and shell<br>comprising methyl acrylate<br>From Kaneka Corp<br>Product name: Kane-ace M-711 |
| | Elvaloy AS | Ethylene-butyl acrylate-glycidyl methacrylate copolymer<br>From DuPont-Mitsui Polychemicals<br>product name: Elvaloy AS |
| (E)<br>Release agent | Licowax E | Montanic acid ester wax<br>From Clariant, product name: Licowax E |
| | PED522 | Oxidized polyethylene wax<br>From Clariant<br>Product name: Licowax PED522 |
| Stabilizer | AO60 | Hindered phenol-based stabilizer<br>Pentaerythritol tetrakis[3-(3,5-tert-butyl-4-hydroxyphenyl) propionate]<br>From Adeka, product name: ADK STAB AO-60 |
| Carbon black | EX3531 | Master batch of acrylonitrile-styrene copolymer<br>resin containing 50 mass % of carbon black<br>From Nippon Pigment Co., Ltd.<br>Product name EX3531 |
| Epoxy compound | EP17 | Bisphenol A-based epoxy compound<br>From Adeka, product name: EP-17 |
| Inorganic filler | T127 | Glass fibers, from Nippon Electric Glass Co.<br>Product name: T-127<br>Chopped strand glass fibers<br>Average fiber diameter of 13 μm<br>Treated with novolac type epoxy resin |

Examples 1 to 24 and Comparative Examples 1 to 6

Pellets of polybutylene terephthalate resin compositions were obtained by blending components other than glass fibers shown in Table 1 above at the proportions shown in Tables 2 to 4 below (the proportions are shown in terms of parts by mass), melt kneading the obtained blend using a 30 mm vented twin screw extruder (twin screw extruder TEX30α from the Japan Steel Works, Ltd.) at a barrel temperature of 270° C. while supplying glass fibers from a side feeder, extruding into a strand, and then obtaining pellets using a strand cutter.

<Measurement of Crystallization Temperature (Tc)>

The obtained pellets were dried for 5 hours at a temperature of 120° C. using a hot air current dryer, and injection molded into an ISO test piece using an injection molding machine ("J85AD" from the Japan Steel Works, Ltd.) at a cylinder temperature of 250° C. and a die temperature of 80° C., and the ISO test piece was subjected to DSC measurements using a "PYRIS Diamond DSC" from PerkinElmer, Inc. in a nitrogen atmosphere by increasing the temperature from 30° C. to 300° C. at a rate of 20° C./min, holding at 300° C. for 3 minutes, and then decreasing the temperature at a rate of 20° C./min. The crystallization temperature (Tc) was deemed to be the peak top temperature of an exothermic peak observed when lowering the temperature.

<Formation of Test Piece with Boss Part>

FIG. 2(b) is a top view of a test piece 10, and a boss part 12 is provided in the center of the test piece 10. FIG. 2(a) is a diagram showing the test piece 10, with the boss part 12 side protruding downwards from the side attached to the test piece 10 shown in FIG. 2(b), and FIG. 2(c) is a cross-sectional view along the center line A-A that passes through the boss part 12 shown in FIG. 2(b). The boss part 12 has a height of 2 mm, and is formed into the shape of a partially cut away circular cylinder in which R=2 mm, as shown in the diagram. In addition, a linear rib 13 having a height of 2 mm is formed at the bottom of the test piece 10.

Test pieces having boss parts shown in FIG. 2 were formed by drying at 120° C. using a hot air current dryer for the periods of time shown in Tables 2 to 4 (1.5 to 5 hours) so as to obtain pellets having different moisture content values, and then injecting a resin from a film gate provided on the 13 side shown in FIG. 2(b) using an injection molding machine ("NEX80" from Nissei Plastic Industrial Co., Ltd.) under conditions of a cylinder temperature of 260° C., a die temperature of 80° C., a cooling time of 20 seconds, a filling time of 1.5 seconds and a holding pressure value of 80% of the injection peak pressure.

<Moisture Content>

The moisture content (units: ppm by mass) of the dried pellets was measured using a Karl Fischer coulometric moisture meter ("CA-200" from Mitsubishi Chemical Analytech Co., Ltd.). The heating temperature was set to 200° C., and nitrogen gas was used as the carrier gas.

The evaluation results above are shown in Tables 2 to 4 below.

<Measurement of Boss Strength>

Boss strength was measured by holding and fixing the test piece 10 shown in FIG. 2 with a clamp on a pedestal (not shown) between the rib 13 and the boss part 12, inserting the boss part 12 into a hole 15 using a metal tensile jig 14 shown by the dotted line in FIG. 2(b), and pulling up the tensile jig 14 at a test speed of 20 mm/min in the direction of the arrow, and the strength (units: N) when the boss part 12 broke was determined and deemed to be the boss part strength.

<Evaluation of Mold-Release Properties>

A box-shaped molded article (height: 30 mm, width: 54 mm, depth: 34 mm, wall thickness: 1.5 mm) having a central dividing wall, as shown in FIG. 4, was formed using the obtained pellets by injecting a resin from a side gate (gate thickness: 1.5 mm, gate width: 3 mm) provided near the center of the outermost surface on the left-hand side of the box-shaped molded article shown by the arrow in FIG. 4 using a "α100iA" model injection molding machine from FANUC Corporation at a cylinder temperature of 250° C. and a preset die temperature regulator temperature of 80° C.

FIG. 5 is a top view that shows the box-shaped molded article shown in FIG. 4 and ejector pins, and FIG. 6 is an explanatory view that shows the positions at which the ejector pins meet the bottom of the box-shaped molded article. The molded article was removed by bringing a total of 4 pressure sensor-fitted ejector pins shown in FIG. 5 into contact with the bottom of a box-shaped molded article such as that shown in FIG. 6 so as to push out the molded article.

The cooling time was set to 10 seconds, molding was carried out, and a box-shaped molded article was removed from the die by pushing out with the ejector pins.

Assessments were made using the three criteria shown below on the basis of deformation of the bottom plate of an obtained box-shaped molded article and whether a sound occurred during removal.

"A: No deformation of the bottom plate occurred, and no sound occurred during removal"

"B: Deformation of the bottom plate occurred, and an abnormal sound occurred during removal"

"X: The bottom plate was pierced"

<Measurement of Mold-Release Resistance Value>

The obtained pellets were dried for 5 hours at a temperature of 120° C. using a hot air current dryer and molded into a box-shaped molded article having a wall thickness of 1.5 mm and outer dimensions of 30×50×15 mm using an injection molding machine from Sumitomo Heavy Industries, Ltd. (mold clamping force: 50 T) at a cylinder temperature of 260° C., a die temperature of 80° C. and a cooling time of 10 seconds, and the maximum resistance when the molded article was released by being pushed out by ejector pins was evaluated as the mold-release resistance value (units: MPa).

<Tensile Strength Retention Rate After 200 Hours Processing: Evaluation of Hydrolysis Resistance>

The obtained pellets were dried for 5 hours at a temperature of 120° C. using a hot air current dryer and then injection molded into ISO multipurpose test pieces (thickness 4 mm) using an injection molding machine ("NEX80" from Nissei Plastic Industrial Co., Ltd.) at a cylinder temperature of 250° C. and a die temperature of 80° C.

Using the ISO multipurpose test pieces, tensile strength (before processing) (units: MPa) was measured in accordance with ISO 527 at a pulling speed of 5 mm/min.

In addition, the ISO multipurpose test pieces were processed for 200 hours using a pressure cooker tester (PCT) (from Hirayama Manufacturing Corporation) at a temperature of 121° C., a relative humidity of 100% and a pressure of 2 atm, and then measured in terms of tensile strength in the same way, and the strength retention rate, which is strength following processing relative to its strength before processing (units: %), was calculated.

<Notched Charpy Impact Strength>

Notched test pieces having thicknesses of 4.0 mm were prepared from the ISO multipurpose test pieces (thickness: 4.0 mm), and the notched Charpy impact strength (units: kJ/m$^2$) was measured in accordance with ISO 179 specifications.

<Shrinkage Rate>

The obtained pellets were dried for 5 hours at a temperature of 120° C. using a hot air current dryer, and then molded into flat sheets having lengths of 100 mm, widths of 100 mm and thicknesses of 2 mm by means of a film gate die using an injection molding machine ("NEX80" from Nissei Plastic Industrial Co., Ltd.) at a cylinder temperature of 260° C. and a die temperature of 80° C., and the mold shrinkage factor in a direction perpendicular to flow (TD direction shrinkage rate, units: %) was determined.

The evaluation results above are shown in Table 2 below.

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A) PBT resin | 5007 | | | 45.0 | 90.0 | | | | | | | |
| | 5008 | 21.3 | | | | 78.3 | 21.3 | 21.3 | 27.0 | 23.3 | 19.2 | 14.7 |
| | 5020 | 68.6 | 90.0 | 45.0 | | 16.7 | 68.6 | 68.6 | 63.7 | 66.9 | 70.5 | 74.4 |
| | 5510 | 10.1 | 10.0 | 10.0 | 10.0 | 5.0 | 10.1 | 10.1 | 9.3 | 9.8 | 10.3 | 10.9 |
| Total parts by mass of PBT | | 100 | 100 | 100 | 100 | 100 | 100 | 100 | 100 | 100 | 100 | 100 |
| Intrinsic viscosity of PBT (arithmetic average) | | 1.1 | 1.2 | 1.0 | 0.7 | 0.9 | 1.1 | 1.1 | 1.1 | 1.1 | 1.1 | 1.1 |
| (B1-1) Brominated epoxy | ECX-30 | 37.1 | 37.1 | 37.1 | 37.1 | 13.9 | 37.1 | 37.1 | 34.6 | 36.2 | 38.1 | 40.2 |
| (B1-2) Brominated polycarbonate | FR-53 | | | | | | | | | | | |
| (B2-1) Brominated epoxy | CXB3000H | 9.3 | 9.3 | 9.3 | 9.3 | 32.5 | 9.3 | 9.3 | 8.6 | 9.0 | 9.5 | 10.1 |
| (B2-2) Brominated polystyrene | PBS-64HW | | | | | | | | | | | |
| (BX) Brominated acrylic | FR1025 | | | | | | | | | | | |
| (B1):(B2) | | 80:20 | 80:20 | 80:20 | 80:20 | 30:70 | 80:20 | 80:20 | 80:20 | 80:20 | 80:20 | 80:20 |
| (B1) + (B2) | | 46.4 | 46.4 | 46.4 | 46.4 | 46.4 | 46.4 | 46.4 | 43.2 | 45.2 | 47.6 | 50.3 |
| (C) Antimony compound | | 8.2 | 8.2 | 8.2 | 8.2 | 8.2 | 8.2 | 8.2 | 7.7 | 8.0 | 8.5 | 8.9 |
| (D) Elastomer | GMA AX8900 | 18.0 | 18.0 | 18.0 | 18.0 | 18.0 | | | 9.6 | 15.1 | 21.2 | 27.9 |
| | M711 | | | | | | 18.0 | | | | | |
| | Elvaloy AS | | | | | | | 18.0 | | | | |
| (E) Release agent | Licowax E PED522 | 1.3 | 1.3 | 1.3 | 1.3 | 1.3 | 1.3 | 1.3 | 1.2 | 1.3 | 1.3 | 1.4 |
| Stabilizer | AO60 | 0.8 | 0.8 | 0.8 | 0.8 | 0.8 | 0.8 | 0.8 | 0.7 | 0.8 | 0.8 | 0.8 |
| CB master batch | EX3531 | 5.2 | 5.2 | 5.2 | 5.2 | 5.2 | 5.2 | 5.2 | 4.8 | 5.0 | 5.3 | 5.6 |
| CB content | | 2.6 | 2.6 | 2.6 | 2.6 | 2.6 | 2.6 | 2.6 | 2.4 | 2.5 | 2.6 | 2.8 |
| Epoxy compound | EP17 | 0.5 | 0.5 | 0.5 | 0.5 | 0.5 | 0.5 | 0.5 | 0.5 | 0.5 | 0.5 | 0.6 |
| Inorganic filler | T127 | 77.3 | 77.3 | 77.3 | 77.3 | 77.3 | 77.3 | 77.3 | 71.8 | 75.4 | 79.4 | 83.8 |
| Crystallization temperature (Tc) | °C. | 183 | 183 | 183 | 183 | 193 | 193 | 193 | 183 | 183 | 183 | 183 |
| Drying time before injection molding | Hour | 5 | 5 | 5 | 5 | 5 | 5 | 5 | 5 | 5 | 5 | 5 |
| Moisture content | ppm | 80 | 80 | 80 | 80 | 80 | 80 | 80 | 80 | 80 | 80 | 80 |
| Holding pressure during molding (Ratio relative to injection peak pressure) | Ratio | 8 | 8 | 8 | 8 | 8 | 8 | 8 | 8 | 8 | 8 | 8 |
| Boss strength | N | 334 | 340 | 305 | 300 | 310 | 310 | 310 | 365 | 350 | 320 | 300 |
| Release properties | — | A | A | A | A | A | A | A | A | A | A | A |
| Release resistance value | MPa | 5 | 5 | 5 | 5 | 4 | 5 | 5 | 5 | 5 | 5 | 5 |
| Tensile strength retention rate (After 200 hours processing) | % | 60 | 61 | 59 | 57 | 51 | 51 | 60 | 59 | 60 | 60 | 61 |
| Impact strength (Notched Charpy) | KJ/m$^2$ | 12 | 12 | 12 | 12 | 12 | 12 | 12 | 10 | 11 | 12 | 13 |
| TD shrinkage rate | % | 0.80 | 0.80 | 0.80 | 0.80 | 0.90 | 0.90 | 0.85 | 0.90 | 0.80 | 0.75 | 0.75 |

TABLE 3

| | | Example | | | | | | | | | | | | |
|---|---|---|---|---|---|---|---|---|---|---|---|---|---|---|
| | | 12 | 13 | 14 | 15 | 16 | 17 | 18 | 19 | 20 | 21 | 22 | 23 | 24 |
| (A) PBT resin | 5007 | | | | | | | | | | | | | |
| | 5008 | 21.8 | 21.3 | 49.6 | 56.8 | 64.2 | 71.6 | 23.3 | 21.3 | 21.3 | 21.3 | 23.3 | 23.3 | 23.3 |
| | 5020 | 68.2 | 68.6 | 38.7 | 33.1 | 27.4 | 21.7 | 66.9 | 68.6 | 68.6 | 68.6 | 66.9 | 66.9 | 66.9 |
| | 5510 | 10.0 | 10.1 | 11.7 | 10.1 | 8.4 | 6.7 | 9.8 | 10.1 | 10.1 | 10.1 | 9.8 | 9.8 | 9.8 |
| Total parts by mass of PBT | | 100 | 100 | 100 | 100 | 100 | 100 | 100 | 100 | 100 | 100 | 100 | 100 | 100 |
| Intrinsic viscosity of PBT (arithmetic average) | | 1.1 | 1.1 | 1.0 | 1.0 | 1.0 | 0.9 | 1.1 | 1.1 | 1.1 | 1.1 | 1.1 | 1.1 | 1.1 |
| (B1-1) Brominated epoxy | ECX-30 | 36.9 | 37.1 | 32.5 | 27.8 | 23.2 | 18.6 | 28.1 | 37.1 | 37.1 | 37.1 | 36.2 | 36.2 | |
| (B1-2) Brominated polycarbonate | FR-53 | | | | | | | | | | | | | 36.2 |
| (B2-1) Brominated epoxy | CXB3000H | 9.2 | 9.3 | 13.9 | 18.6 | 23.2 | 27.8 | 7.0 | 9.3 | 9.3 | 9.3 | 9.0 | 9.0 | 9.0 |
| (B2-2) Brominated polystyrene | PBS-64HW | | | | | | | | | | | | | |
| (BX) Brominated acrylic | FR1025 | | | | | | | | | | | | | |
| (B1):(B2) | | 80:20 | 80:20 | 70:30 | 60:40 | 50:50 | 40:60 | 80:20 | 80:20 | 80:20 | 90:10 | 80:20 | 90:20 | 80:20 |
| (B1) + (B2) | | 46.1 | 46.4 | 46.4 | 46.4 | 46.4 | 46.4 | 35.2 | 46.4 | 46.4 | 46.4 | 45.2 | 45.2 | 45.2 |
| (C) Antimony compound | | 8.2 | 8.2 | 8.2 | 8.2 | 8.2 | 8.2 | 8.0 | 8.2 | 8.2 | 8.2 | 7.7 | 7.7 | 7.7 |
| (D) Elastomer | GMA AX8900 | 17.9 | 18.0 | 18.0 | 18.0 | 18.0 | 18.0 | 25.1 | 18.0 | 18.0 | 18.0 | 15.1 | 15.1 | 15.1 |
| | M711 | | | | | | | | | | | | | |
| | Elvaloy AS | | | | | | | | | | | | | |
| (E) Release agent | Licowax E | 0.6 | 1.3 | 1.3 | 1.3 | 1.3 | 1.3 | 1.3 | 1.3 | 1.3 | 1.3 | 1.3 | 1.3 | 1.3 |
| Stabilizer | PED522 | 0.8 | 0.8 | 0.8 | 0.8 | 0.8 | 0.8 | 0.8 | 0.8 | 0.8 | 0.8 | 0.8 | 0.8 | 0.8 |
| | AO60 | 5.1 | 5.2 | 5.2 | 5.2 | 5.2 | 5.2 | 5.0 | 5.2 | 5.2 | 5.2 | 5.0 | 5.0 | 5.0 |
| CB master batch | EX3531 | 2.6 | 2.6 | 2.6 | 2.6 | 2.6 | 2.6 | 2.5 | 2.6 | 2.6 | 2.6 | 2.5 | 2.5 | 2.5 |
| CB content | | 0.5 | 0.5 | 0.5 | 0.5 | 0.5 | 0.5 | 0.5 | 0.5 | 0.5 | 0.5 | 0.5 | 0.5 | 0.5 |
| Epoxy compound | EP17 | 76.8 | 77.3 | 77.3 | 77.3 | 77.3 | 77.3 | 75.4 | 77.3 | 77.3 | 77.3 | 75.4 | 75.4 | 75.4 |
| Inorganic filler | T127 | | | | | | | | | | | | | |
| Crystallization temperature (Tc) | °C. | 183 | 183 | 187 | 189 | 190 | 192 | 183 | 183 | 183 | 183 | 192 | 182 | 191 |
| Drying time | Hour | 5 | 5 | 5 | 5 | 5 | 5 | 5 | 4 | 2 | 1.5 | 5 | 5 | 5 |
| Moisture content | ppm | 80 | 80 | 80 | 80 | 80 | 80 | 80 | 150 | 300 | 400 | 80 | 80 | 80 |
| Holding pressure during molding (Ratio relative to injection peak pressure) | Ratio | 8 | 8 | 8 | 8 | 8 | 8 | 8 | 8 | 8 | 8 | 8 | 8 | 8 |
| Boss strength | N | 334 | 334 | 328 | 324 | 320 | 305 | 334 | 325 | 310 | 300 | 318 | 365 | 320 |
| Release properties | — | B | B | A | A | A | A | A | A | A | A | A | A | A |
| Release resistance value | MPa | 11 | 10 | 5 | 5 | 5 | 5 | 5 | 5 | 5 | 5 | 5 | 5 | 5 |
| Tensile strength retention rate (After 200 hours processing) | % | 58 | 58 | 55 | 52 | 51 | 51 | 59 | 59 | 57 | 56 | 53 | 58 | 50 |
| Impact strength (Notched Charpy) | KJ/m² | 12 | 12 | 12 | 12 | 12 | 12 | 12 | 12 | 12 | 12 | 13 | 10 | 13 |
| TD shrinkage rate | % | 0.80 | 0.80 | 0.90 | 0.70 | 0.90 | 0.70 | 0.90 | 0.80 | 0.80 | 0.80 | 0.70 | 0.75 | 0.70 |

TABLE 4

|  |  | Comparative Example | | | | | |
| --- | --- | --- | --- | --- | --- | --- | --- |
|  |  | 1 | 2 | 3 | 4 | 5 | 6 |
| (A) PBT resin | 5007 |  |  |  |  |  |  |
|  | 5008 | 100 | 27.6 | 30.3 | 9.7 | 27.0 | 27.0 |
|  | 5020 |  | 55.6 | 60.8 | 78.8 | 63.7 | 63.7 |
|  | 5510 |  | 16.8 | 8.9 | 11.5 | 9.3 | 9.3 |
| Total parts by mass of PBT |  | 100 | 100 | 100 | 100 | 100 | 100 |
| Intrinsic viscosity of PBT (arithmetic average) |  | 0.9 | 1.1 | 1.1 | 1.1 | 1.1 | 1.1 |
| (B1-1) Brominated epoxy | ECX-30 |  | 46.4 | 32.9 | 42.6 | 34.6 |  |
| (B1-2) Brominated polycarbonate | FR-53 |  |  |  |  |  | 34.6 |
| (B2-1) Brominated epoxy | CXB3000H | 46.4 |  | 8.2 | 10.7 |  |  |
| (B2-2) Brominated polystyrene | PBS-64HW |  |  |  |  |  |  |
| (BX) Brominated acrylic | FR1025 |  |  |  |  | 8.6 | 8.6 |
| (B1):(B2) |  | 0:100 | 100:0 | 80:20 | 80:20 | 80:20 | 80:20 |
| (B1) + (B2) |  | 46.4 | 46.4 | 41.1 | 53.3 | 43.2 | 43.2 |
| (C) Antimony compound | GMA | 8.3 | 8.2 | 7.3 | 9.5 | 7.7 | 7.7 |
| (D) Elastomer | AX8900 | 18.1 | 18.0 | 4.0 | 35.5 | 9.6 | 9.6 |
|  | M711 |  |  |  |  |  |  |
|  | Elvaloy AS |  |  |  |  |  |  |
| (E) Release agent | Licowax E | 1.3 |  | 1.1 | 1.5 | 1.2 | 1.2 |
|  | PED522 |  | 1.3 |  |  |  |  |
| Stabilizer | AO60 | 0.8 | 0.8 | 0.7 | 0.9 | 0.7 | 0.7 |
| CB master batch | EX3531 | 5.2 | 5.2 | 4.6 | 5.9 | 4.8 | 4.8 |
| CB content |  | 2.6 | 2.6 | 2.3 | 3.0 | 2.4 | 2.4 |
| Epoxy compound | EP17 | 0.5 | 0.5 | 0.5 | 0.6 | 0.5 | 0.5 |
| Inorganic filler | T127 | 77.4 | 77.3 | 68.5 | 88.8 | 71.8 | 71.8 |
| Crystallization temperature (Tc) | ° C. | 196 | 178 | 183 | 183 | 177 | 172 |
| Drying time before injection molding | Hour | 5 | 5 | 5 | 5 | 5 | 5 |
| Moisture content | ppm | 80 | 80 | 80 | 80 | 80 | 80 |
| Holding pressure during molding (Ratio relative to injection peak pressure) | Ratio | 8 | 8 | 8 | 8 | 8 | 8 |
| Boss strength | N | 290 | 340 | 360 | 280 | 372 | 374 |
| Release properties | — | A | X | A | A | X | X |
| Release resistance value | MPa | 5 | 15 | 5 | 5 | 16 | 19 |
| Tensile strength retention rate (After 200 hours processing) | % | 48 | 69 | 58 | 62 | 54 | 49 |
| Impact strength (Notched Charpy) | KJ/m$^2$ | 12 | 12 | 8 | 14 | 12 | 12 |
| TD shrinkage rate | % | 0.90 | 0.70 | 1.00 | 0.70 | 0.80 | 0.80 |

Examples 25 to 40 and Comparative Examples 7 to 13

Pellets of polybutylene terephthalate resin materials were obtained by blending components other than glass fibers shown in Table 1 above at the proportions shown in Table 5 below (the proportions are shown in terms of parts by mass), melt kneading the obtained blend using a 30 mm vented twin screw extruder (twin screw extruder TEX30α from the Japan Steel Works, Ltd.) at a barrel temperature of 270° C. while supplying glass fibers from a side feeder, extruding into a strand, and then obtaining pellets using a strand cutter.

<Measurement of Crystallization Temperature (Tc)>

DSC measurements were carried out in the same way as described above using the obtained pellets. The crystallization temperature (Tc) was deemed to be the peak top temperature of an exothermic peak observed when lowering the temperature.

<Formation of Test Piece with Boss Part>

The shape of a test piece with boss part that was formed for purposes of evaluation was the same as that shown in FIG. 2 above.

Test pieces having boss parts shown in FIG. 2 were formed by drying pellets of the thus obtained polybutylene terephthalate resin materials at 120° C. using a hot air current dryer for the periods of time shown in Table 5 (0 to 5 hours) so as to obtain pellets having different moisture content values, and then injecting a resin from a film gate provided on the 13 side shown in FIG. 2(b) using an injection molding machine ("NEX80" from Nissei Plastic Industrial Co., Ltd.) under conditions of a cylinder temperature of 260° C., a die temperature of 80° C., a cooling time of 20 seconds, a filling time of 1.5 seconds and a holding pressure value of 80% of the injection peak pressure.

<Moisture Content>

The moisture content (units: ppm by mass) of the dried pellets was measured in the same way as that described above.

<Measurement of Area of Voids in Boss Part and Portion Below Boss Part>

A cross section of the boss part and a portion below the boss part in the obtained test piece (cross section A-A shown in FIG. 2) was observed using the following X-Ray CT apparatus from Yamato Scientific Co., Ltd.

Apparatus: TDM-1000H-II (2K) from Yamato Scientific Co., Ltd. Voltage: 80 kV, current: 20 µA
Axis of magnification (magnification rate): 40 to 110 mm
Analysis software: 3-dimensional analysis software TRI/3D-BON64 from Ratoc System Engineering Co., Ltd.

In the boss part and the portion below the boss part in the obtained test piece, an image of the cross section A-A shown in FIG. 2 was binarized and classified into resin portions and void portions. Image processing was carried out using "Image Pro Plus" from Nippon Roper K.K.

As shown as the areas indicated by the dotted lines in FIG. 3, the sum total S1 of the cross-sectional areas of voids which are present in a region lying at a height of 0 to 0.5 mm from the surface of the boss part base (surface B-B in FIG. 3) was determined, the sum total S2 of the cross-sectional areas of voids which are present in a region lying at a depth of 0 to 0.5 mm from the surface of the base below the boss part (surface B-B in FIG. 3) was determined, and the areal ratio (units: %) of S1 and the areal ratio (units: %) of S2 relative to the total area of S1 and S2 (100%) were calculated.

<Measurement of Boss Part Strength>

Boss part strength was measured by holding and fixing the test piece 11 with a clamp on a pedestal (not shown) between the rib 13 and the boss part 12, as shown in FIG. 2, inserting the boss part 12 into a hole 15 using a metal tensile jig 14 shown by the dotted line in FIG. 2(b), and pulling up the tensile jig 14 at a test speed of 20 mm/min in the direction of the arrow, and the strength (units: N) when the boss part 12 broke was determined and deemed to be the boss part strength.

<Boss Strength Retention Rate after 100 Hours Processing: Evaluation of Hydrolysis Resistance>

Test pieces having boss parts shown in FIG. 2 were formed by drying pellets of the thus obtained polybutylene terephthalate resin materials at 120° C. using a hot air current dryer for the periods of time shown in Table 5 (0 to 5 hours) so as to obtain pellets having different moisture content values, and then injecting a resin from a film gate provided on the lower using an injection molding machine ("NEX80" from Nissei Plastic Industrial Co., Ltd.) under conditions of a cylinder temperature of 260° C., a die temperature of 80° C., a cooling time of 20 seconds, a filling time of 1.5 seconds and a holding pressure value of 80% of the injection peak pressure. The test pieces were processed for 100 hours using a pressure cooker tester (PCT) (from Hirayama Manufacturing Corporation) at a temperature of 121° C., a relative humidity of 100% and a pressure of 2 atm, and then measured in terms of strength in the same way, and the strength retention rate of strength following processing relative to strength before processing (units: %) was calculated.

<Evaluation of Mold-Release Properties>

The obtained pellets were molded into a box-shaped molded article in the same way as described above, and the molded article was removed from the die by being pushed out by the ejector pins.

Assessments were made using the three criteria below on the basis of deformation of the bottom plate of an obtained box-shaped molded article and whether a sound occurred during removal.

"A: No deformation of the bottom plate occurred, and no sound occurred during removal"

"B: Deformation of the bottom plate occurred, and an abnormal sound occurred during removal"

"X: The bottom plate was pierced"

<Measurement of Release Resistance Value>

The obtained pellets were dried for 5 hours at a temperature of 120° C. using a hot air current dryer for the periods of time shown in Table 5 below (0 to 5 hours), and then molded into a box-shaped molded article having a wall thickness of 1.5 mm and outer dimensions of 30×50×15 mm using an injection molding machine from Sumitomo Heavy Industries, Ltd. (mold clamping force: 50 T) at a cylinder temperature of 260° C., a die temperature of 80° C., a filling time of 1 second, a holding pressure value of 80% of the injection peak pressure and a cooling time of 10 seconds, and the maximum resistance when the molded article was released by being pushed out by ejector pins was evaluated as the release resistance value (units: MPa).

The evaluation results are shown in Table 5 below.

TABLE 5

| | | | Example | | | | | |
|---|---|---|---|---|---|---|---|---|
| | | | 25 | 26 | 27 | 28 | 29 | 30 |
| (A) PBT resin | 5008 | | 100 | 100 | 100 | 100 | 100 | 100 |
| | 5020 | | | | | | | |
| | 5510 | | | | | | | |
| Total parts by mass of PBT | | | 100 | 100 | 100 | 100 | 100 | 100 |
| (B1-1) Brominated epoxy | ECX-30 | | | | | | | |
| (B1-2) Brominated polycarbonate | FR-53 | | | | | | | |
| (B2-1) Brominated epoxy | CXB3000H | | | | | | | |
| (B2-2) Brominated polystyrene | PBS-64HW | | | | | | | |
| (BX) Brominated acrylic | FR1025 | | | | | | | |
| (B1):(B2) | | | — | — | — | — | — | — |
| (B1) + (B2) | | | — | — | — | — | — | — |
| (C) Antimony compound | GMA | | | | | | | |
| (D) Elastomer | AX8900 | | | | | | 7.8 | 7.8 |
| (E) Release agent | Licowax E | | 0.3 | 0.3 | 0.3 | 0.3 | 0.3 | 0.3 |
| Stabilizer | AO60 | | | | | | | |
| CB master batch | EX3531 | | 0.6 | 0.6 | 0.6 | 0.6 | 0.6 | 0.6 |
| CB content | | | 0.3 | 0.3 | 0.3 | 0.3 | 0.3 | 0.3 |
| Epoxy compound | EP17 | | | | | 0.4 | | 0.5 |
| Inorganic filler | T127 | | 43.0 | 43.0 | 43.0 | 43.2 | 46.7 | 46.9 |
| Crystallization temperature (Tc) | ° C. | | 191 | 191 | 191 | 190 | 189 | 188 |
| Pellet drying time before molding | Hour | | 5 | 4 | 1 | 4 | 4 | 4 |
| Moisture content before molding | ppm | | 80 | 150 | 500 | 150 | 150 | 150 |
| Holding pressure during molding ratio relative to peak pressure | Ratio | | 8 | 8 | 8 | 8 | 8 | 8 |

TABLE 5-continued

|  |  | Example | | | | | |
| --- | --- | --- | --- | --- | --- | --- | --- |
|  |  | 25 | 26 | 27 | 28 | 29 | 30 |
| Void areal ratio (%) | Boss part (S1) | 7 | 17 | 23 | 15 | 15 | 13 |
|  | Base part (S2) | 93 | 83 | 77 | 85 | 85 | 87 |
|  | Total | 100 | 100 | 100 | 100 | 100 | 100 |
| Boss strength | N | 470 | 460 | 420 | 465 | 430 | 440 |
| Boss strength retention rate (After 100 hours processing) | % | 33 | 31 | 28 | 71 | 35 | 73 |
| Release properties | — | A | A | A | A | A | A |
| Release resistance value | MPa | 4 | 5 | 5 | 5 | 5 | 5 |

TABLE 6

|  |  | Example | | | | | | | | | |
| --- | --- | --- | --- | --- | --- | --- | --- | --- | --- | --- | --- |
|  |  | 31 | 32 | 33 | 34 | 35 | 36 | 37 | 38 | 39 | 40 |
| (A) PBT resin | 5008 | 27.0 | 49.5 | 56.9 | 71.6 | 21.3 | 21.3 | 21.3 | 27.0 | 27.0 | 27.0 |
|  | 5020 | 63.7 | 38.7 | 33.1 | 21.7 | 68.6 | 68.6 | 68.6 | 63.7 | 63.7 | 63.7 |
|  | 5510 | 9.3 | 11.7 | 10.1 | 6.7 | 10.1 | 10.1 | 10.1 | 9.3 | 9.3 | 9.3 |
| Total parts by mass of PBT |  | 100 | 100 | 100 | 100 | 100 | 100 | 100 | 100 | 100 | 100 |
| (B1-1) Brominated epoxy | ECX-30 | 34.6 | 32.5 | 27.8 | 18.6 | 37.1 | 37.1 | 37.1 |  | 34.6 |  |
| (B1-2) Brominated polycarbonate | FR-53 |  |  |  |  |  |  |  | 34.6 |  | 34.6 |
| (B2-1) Brominated epoxy | CXB3000H | 8.6 | 13.9 | 18.6 | 27.8 | 9.3 | 9.3 | 9.3 | 8.6 |  |  |
| (B2-2) Brominated polystyrene | PBS-64HW |  |  |  |  |  |  |  |  | 8.6 | 8.6 |
| (BX) Brominated acrylic | FR1025 |  |  |  |  |  |  |  |  |  |  |
| (B1):(B2) |  | 80:20 | 70:30 | 60:40 | 40:60 | 80:20 | 80:20 | 80:20 | 80:20 | 80:20 | 80:20 |
| (B1) + (B2) |  | 43.2 | 46.4 | 46.4 | 46.4 | 46.4 | 46.4 | 46.4 | 43.2 | 43.2 | 43.2 |
| (C) Antimony compound | GMA | 7.7 | 8.2 | 8.2 | 8.2 | 8.2 | 8.2 | 8.2 | 7.7 | 7.7 | 7.7 |
| (D) Elastomer | AX8900 | 9.6 | 18.0 | 18.0 | 18.0 | 18.0 | 18.0 | 18.0 | 9.6 | 9.6 | 9.6 |
| (E) Release agent | Licowax E | 1.2 | 1.3 | 1.3 | 1.3 | 1.3 | 1.3 | 1.3 | 1.2 | 1.2 | 1.2 |
| Stabilizer | AO60 | 0.7 | 0.8 | 0.8 | 0.8 | 0.8 | 0.8 | 0.8 | 0.7 | 0.7 | 0.7 |
| CB master batch | EX3531 | 4.8 | 5.2 | 5.2 | 5.2 | 5.2 | 5.2 | 5.2 | 4.8 | 4.8 | 4.8 |
| CB content |  | 2.4 | 2.6 | 2.6 | 2.6 | 2.6 | 2.6 | 2.6 | 2.4 | 2.4 | 2.4 |
| Epoxy compound | EP17 | 0.5 | 0.5 | 0.5 | 0.5 | 0.5 | 0.5 | 0.5 | 0.5 | 0.5 | 0.5 |
| Inorganic filler | T127 | 71.8 | 77.3 | 77.3 | 77.3 | 77.3 | 77.3 | 77.3 | 71.8 | 71.8 | 71.8 |
| Crystallization temperature (Tc) | °C. | 183 | 187 | 189 | 192 | 183 | 183 | 183 | 192 | 182 | 191 |
| Pellet drying time before molding | Hour | 5 | 5 | 5 | 5 | 4 | 2 | 1.5 | 5 | 5 | 5 |
| Moisture content before molding | ppm | 80 | 80 | 80 | 80 | 150 | 300 | 400 | 80 | 80 | 80 |
| Holding pressure during molding ratio | Ratio | 8 | 8 | 8 | 8 | 8 | 8 | 8 | 8 | 8 | 8 |
| Void areal ratio (%) | Boss part (S1) | 8 | 22 | 36 | 45 | 30 | 39 | 45 | 40 | 10 | 38 |
|  | Base part (S2) | 92 | 78 | 64 | 55 | 70 | 61 | 55 | 60 | 90 | 62 |
|  | Total | 100 | 100 | 100 | 100 | 100 | 100 | 100 | 100 | 100 | 100 |
| Boss strength | N | 365 | 340 | 320 | 305 | 325 | 310 | 300 | 318 | 365 | 320 |
| Boss strength retention rate (After 100 hours processing) | % | 85 | 83 | 80 | 78 | 84 | 82 | 81 | 81 | 83 | 78 |
| Release properties | — | A | A | A | A | A | A | A | A | A | A |
| Release resistance value | MPa | 5 | 5 | 5 | 5 | 5 | 6 | 5 | 5 | 5 | 5 |

TABLE 7

|  |  | Comparative Example | | | | | |
| --- | --- | --- | --- | --- | --- | --- | --- |
|  |  | 7 | 8 | 9 | 10 | 11 | 12 |
| (A) PBT resin | 5009 | 100 | 100 | 100 | 27.0 | 27.0 | 27.0 |
|  | 5020 |  |  |  | 63.7 | 63.7 | 63.7 |
|  | 5510 |  |  |  | 9.3 | 9.3 | 9.3 |
| Total parts by mass of PBT |  | 100 | 100 | 100 | 100 | 100 | 100 |
| (B1-1) Brominated epoxy | ECX-30 |  |  |  | 34.6 |  |  |
| (B1-2) Brominated polycarbonate | FR-53 |  |  |  |  | 34.6 |  |
| (B2-1) Brominated epoxy | CXB3000H |  | 46.4 | 46.4 |  | 34.6 |  |
| (B2-2) Brominated polystyrene | PBS-64HW |  |  |  |  |  |  |

TABLE 7-continued

|  |  | Comparative Example | | | | | |
|---|---|---|---|---|---|---|---|
|  |  | 7 | 8 | 9 | 10 | 11 | 12 |
| (BX) Brominated acrylic | FR1025 |  |  |  | 8.6 | 8.6 | 9.6 |
| (B1):(B2) |  | — | 0:100 | 0:100 | 80:20 | 80:20 | 80:20 |
| (B1) + (B2) |  | — | 46.4 | 46.4 | 43.2 | 43.2 | 43.2 |
| (C) Antimony compound | GMA |  | 8.3 | 8.3 | 7.7 | 7.7 | 7.7 |
| (D) Elastomer | AX8900 |  | 18.1 | 18.1 | 9.6 | 9.6 | 9.6 |
| (E) Release agent | Licowax E | 0.3 | 1.3 | 1.3 | 1.2 | 1.2 | 1.2 |
| Stabilizer | AO60 |  | 0.8 | 0.8 | 0.7 | 0.7 | 0.7 |
| CB master batch | EX3531 | 0.6 | 5.2 | 5.2 | 4.8 | 4.8 | 4.8 |
| CB content |  | 0.3 | 2.6 | 2.6 | 2.4 | 2.4 | 2.4 |
| Epoxy compound | EP17 |  | 0.5 | 0.5 | 0.5 | 0.5 | 0.5 |
| Inorganic filler | T127 | 43.0 | 77.4 | 77.4 | 71.8 | 71.8 | 71.8 |
| Crystallization temperature (Tc) | ° C. | 191 | 196 | 196 | 177 | 177 | 172 |
| Pellet drying time before molding | Hour | 0 | 5 | 1 | 5 | 5 | 5 |
| Moisture content before molding | ppm | 1500 | 80 | 500 | 80 | 80 | 80 |
| Holding pressure during molding ratio relative to peak pressure | Ratio | 8 | 8 | 8 | 8 | 8 | 8 |
| Void areal ratio (%) | Boss part (S1) | 48 | 50 | 60 | 4 | 4 | 4 |
|  | Base part (S2) | 52 | 50 | 40 | 96 | 96 | 96 |
|  | Total | 100 | 100 | 100 | 100 | 100 | 100 |
| Boss strength | N | 295 | 290 | 280 | 372 | 370 | 374 |
| Boss strength retention rate (After 100 hours processing) | % | 25 | 74 | 70 | 84 | 81 | 77 |
| Release properties | — | A | A | A | X | X | X |
| Release resistance value | MPa | 5 | 5 | 5 | 16 | 15 | 19 |

INDUSTRIAL APPLICABILITY

The polybutylene terephthalate resin composition of the present invention exhibits excellent strength when molded into a molded article and, even in cases where a flame retardant is introduced, achieves a balance between strength and flame retardancy and exhibits excellent mold-release properties and hydrolysis resistance, and can therefore be advantageously used in electrical equipment, electronic devices and components thereof.

In addition, the connector connection port for external connection of the present invention exhibits excellent boss part strength due to generating few internal voids, and can therefore be advantageously used as a component of an electrical/electronic device.

REFERENCE SIGNS LIST

1 Engine control unit
2 Housing case
3 Connector part
4 Connector connection port
5 Connector pin
6 Boss part

The invention claimed is:

1. A polybutylene terephthalate resin composition, comprising:
   (A) 100 parts by mass of a polybutylene terephthalate resin,
   (B) a total of 30 to 60 parts by mass of at least two different brominated flame retardants selected from the group consisting of a brominated epoxy compound, a brominated polycarbonate compound and a brominated polystyrene compound,
   (C) 5 to 15 parts by mass of an antimony compound,
   (D) 5 to 30 parts by mass of an elastomer, and
   (E) 0.5 to 3 parts by mass of a mold-release agent,
   wherein the polybutylene terephthalate resin composition has a crystallization temperature of from 175 to 193° C.

2. The polybutylene terephthalate resin composition of claim 1, wherein the at least two different brominated flame retardants (B) comprise:
   a brominated flame retardant (B1), which is selected from among a brominated epoxy compound and a brominated polycarbonate compound and which has a weight average molecular weight of 1000 to 8000, and
   a brominated flame retardant (B2), which is selected from among a brominated epoxy compound and a brominated polystyrene compound and which has a weight average molecular weight of more than 8000 to 70000.

3. The polybutylene terephthalate resin composition of claim 1, wherein the polybutylene terephthalate resin composition has a crystallization temperature of from 180 to 193° C.

4. The polybutylene terephthalate resin composition of claim 1, wherein the at least two different brominated flame retardants (B) are each independently a brominated epoxy compound.

5. The polybutylene terephthalate resin composition of claim 1, comprising a brominated epoxy compound, wherein the brominated epoxy compound is terminally capped by tribromophenol.

6. The polybutylene terephthalate resin composition of claim 2, wherein a mass ratio (B1)/(B2) of the flame retardant (B1) and the flame retardant (B2) is 90/10 to 30/70.

7. The polybutylene terephthalate resin composition of claim 1, wherein the elastomer (D) is an ethylenic elastomer.

8. The polybutylene terephthalate resin composition of claim 7, wherein the ethylenic elastomer is an ethylene-alkyl acrylate ester-glycidyl methacrylate copolymer.

9. The polybutylene terephthalate resin composition of claim 1, wherein the mold-release agent (E) is a montanic acid ester mold-release agent.

10. The polybutylene terephthalate resin composition of claim 1, wherein a moisture content of the polybutylene terephthalate resin composition is 500 ppm or less.

11. A molded article, comprising the polybutylene terephthalate resin composition of claim 1.

12. A vehicular electrical component, comprising the molded article of claim 11.

13. The polybutylene terephthalate resin composition of claim 1, which is free of a polycarbonate resin.

* * * * *